United States Patent [19]

Stark

[11] 4,194,949
[45] Mar. 25, 1980

[54] SOLAR DISTILLATION APPARATUS

[76] Inventor: Virgil Stark, 936 Fifth Ave., New York, N.Y. 10021

[21] Appl. No.: 845,862

[22] Filed: Oct. 31, 1977

Related U.S. Application Data

[63] Continuation-in-part of Ser. No. 810,761, Jun. 30, 1977, Ser. No. 807,513, Jun. 20, 1977, and Ser. No. 806,291, Jun. 15, 1977, said Ser. No. 810,761, and Ser. No. 807,513, each is a continuation-in-part of Ser. No. 806,291, , said Ser. No. 810,761, is a continuation-in-part of Ser. No. 807,513.

[51] Int. Cl.² .............................. B01D 3/00; F24J 3/02
[52] U.S. Cl. ..................................... 202/180; 202/234; 203/DIG. 1; 203/DIG. 20; 203/DIG. 16; 204/254; 204/98; 204/128; 126/432; 126/440
[58] Field of Search .................. 126/270, 271; 60/641; 203/DIG. 1; 202/180; 159/1 S; 350/179, 180, 211, 299

[56] References Cited

U.S. PATENT DOCUMENTS

| | | | |
|---|---|---|---|
| 1,683,266 | 9/1928 | Shipman | 126/271 |
| 1,704,173 | 3/1929 | Chesney | 126/271 |
| 1,951,403 | 3/1934 | Goddard | 126/271 |
| 2,920,710 | 1/1960 | Howard | 126/270 |
| 3,159,554 | 12/1964 | Mount | 159/1 S |
| 3,250,269 | 5/1966 | Sherock | 126/271 |
| 3,351,538 | 11/1967 | Andrassy | 203/DIG. 1 |
| 3,428,529 | 2/1969 | Gumucio | 159/1 S X |
| 3,671,404 | 6/1972 | Meckler | 203/DIG. 1 X |
| 3,738,734 | 6/1973 | Tait et al. | 350/179 |
| 3,901,036 | 8/1975 | Martin | 126/271 |
| 3,915,148 | 10/1975 | Fletcher | 126/271 |
| 3,965,683 | 6/1976 | Dix | 126/271 |
| 4,011,857 | 3/1977 | Rice | 126/271 |
| 4,022,186 | 5/1977 | Northrup | 126/271 |
| 4,069,812 | 1/1978 | O'Neill | 350/211 |
| 4,075,063 | 2/1978 | Tsay et al. | 203/DIG. 1X |

FOREIGN PATENT DOCUMENTS 1165672  10/1958  France ..................................... 126/270

Primary Examiner—Carroll B. Dority, Jr.
Assistant Examiner—Larry Jones
Attorney, Agent, or Firm—Kenyon & Kenyon

[57]  ABSTRACT

According to one aspect of the invention, a system is disclosed for substantially continuous distillation of water which comprises a plurality of parallel distillation units each comprising series of fluid and preferably also Fresnel-type lenses. Water to be distilled is preheated by circulating it through the fluid lenses on which evaporated water vapor is condensed to produce distilled water. The quantity of water circulated in the lenses is many more times the quantity of water evaporated by the solar energy concentrated by the lenses and condensed per unit of time to allow the circulated water to carry off heat recuperated within the lenses and the system. The preheated water circulated through the lenses is discharged into a central container in which the foci of the fluid and Fresnel-type lenses are located. Secondary containers are provided to receive overflow from the central container since preheated water may be discharged into the central container faster than it is being evaporated. Preferably heat exchangers having a heat exchange fluid therein are provided in the secondary containers to recover heat from the water therein. This system also may include or be combined with turbines and or a separate solar energy concentrator and collector used to superheat the heat exchange fluid and also preferably to heat excess water vapor removed from the distillation system and convert it to superheated steam and/or to externally condense the excess water vapor.

18 Claims, 28 Drawing Figures

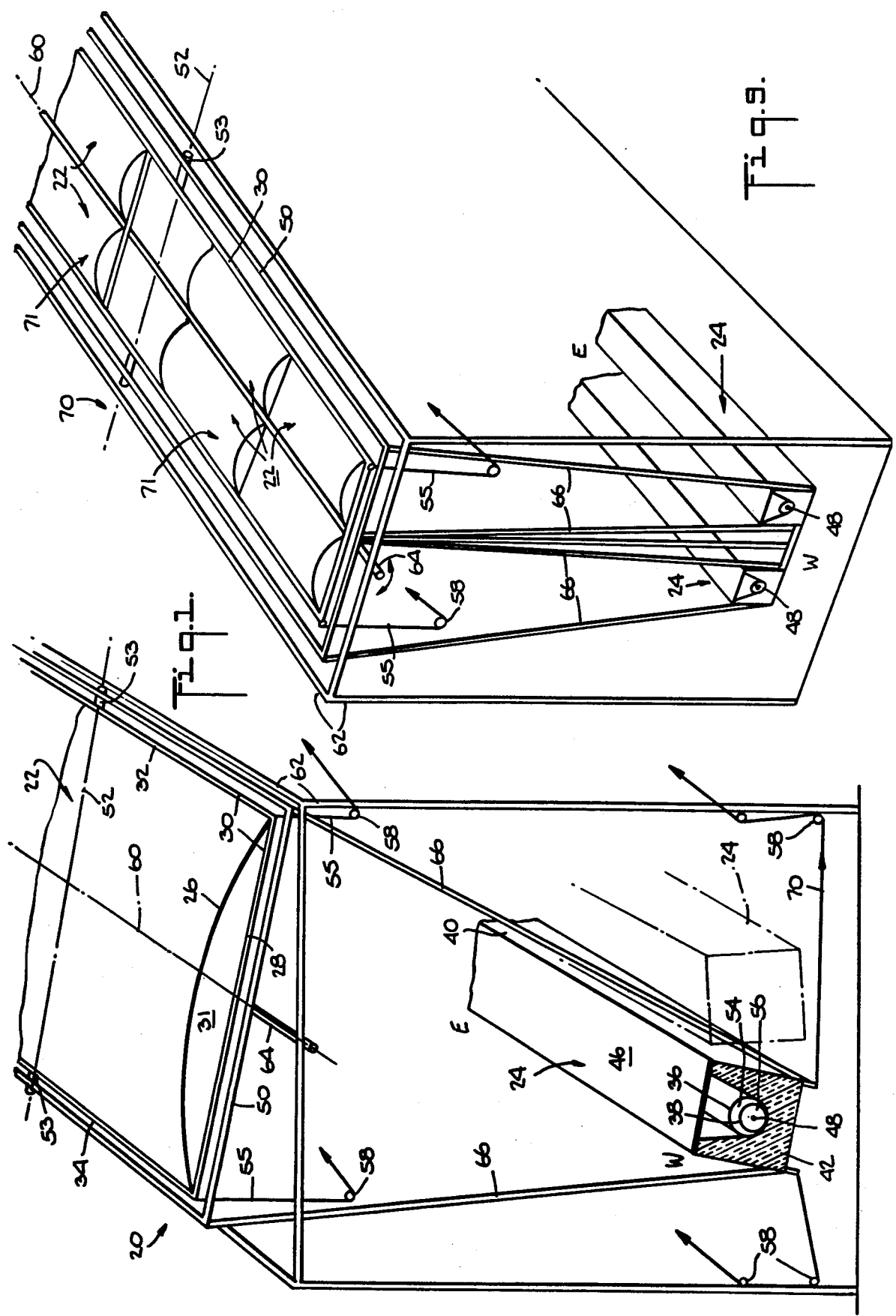

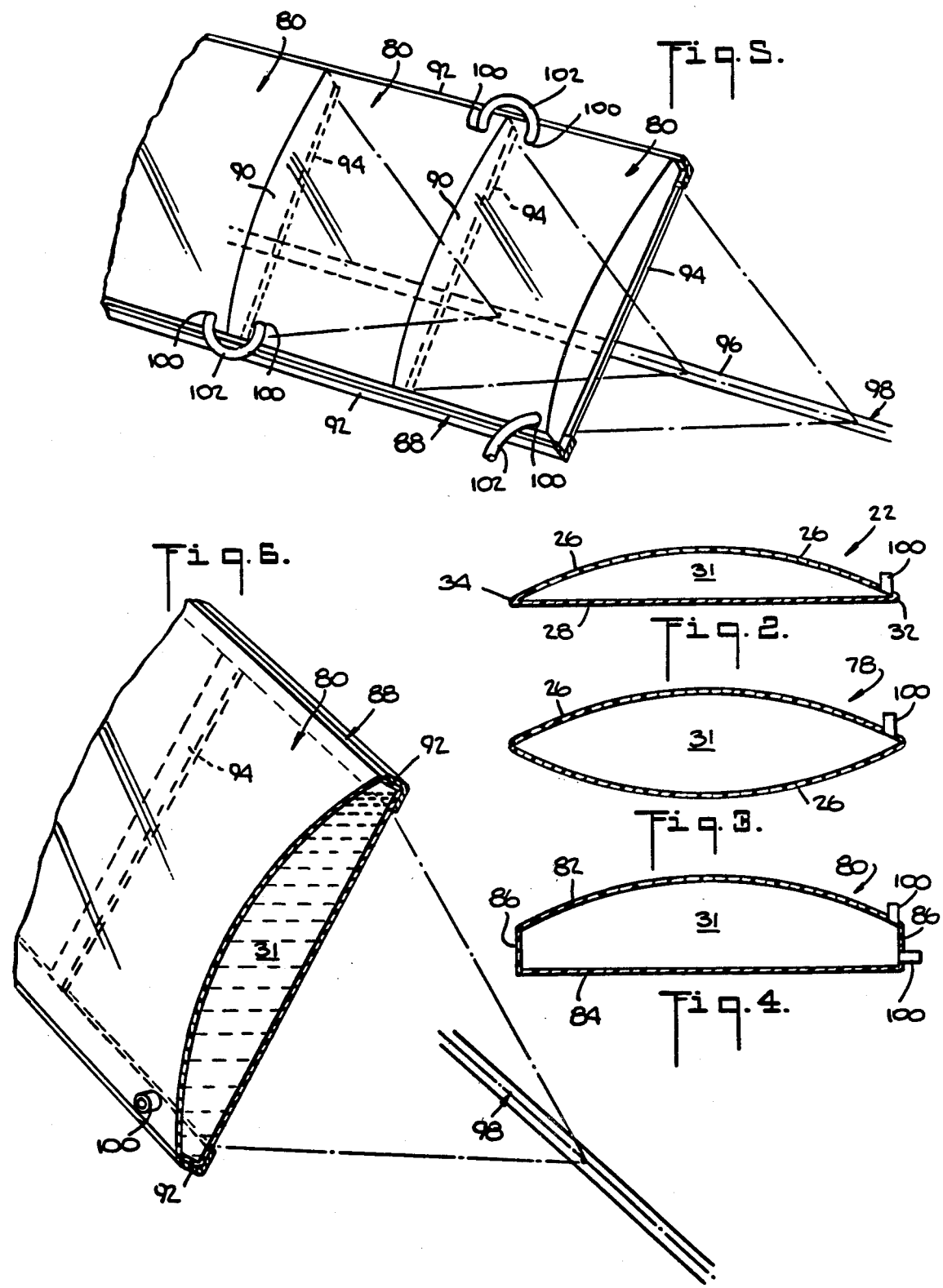

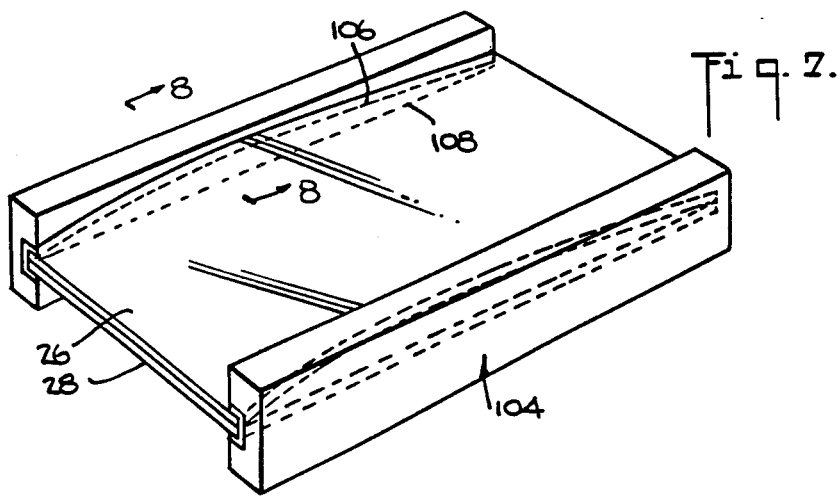
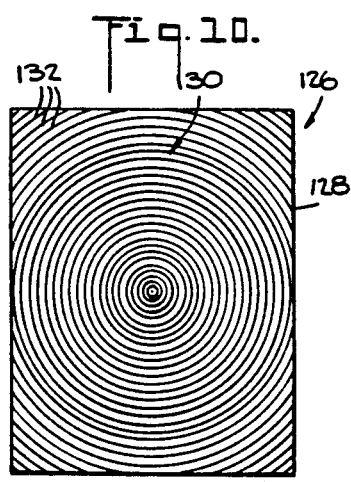
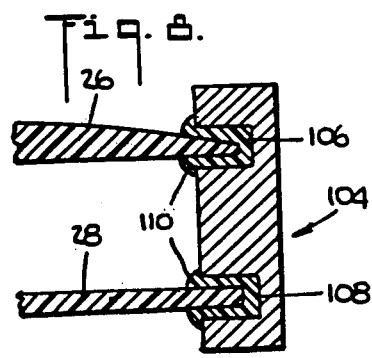

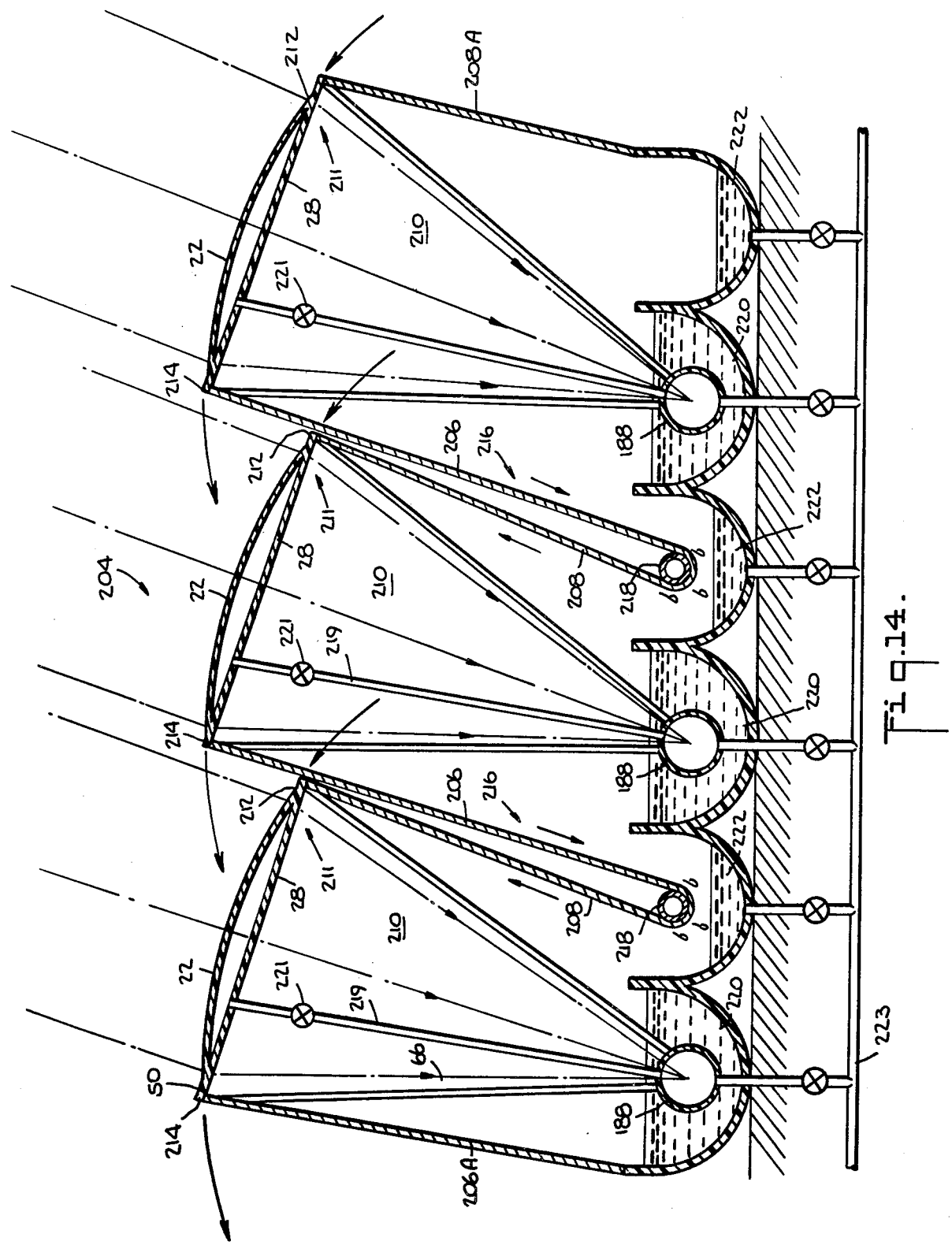

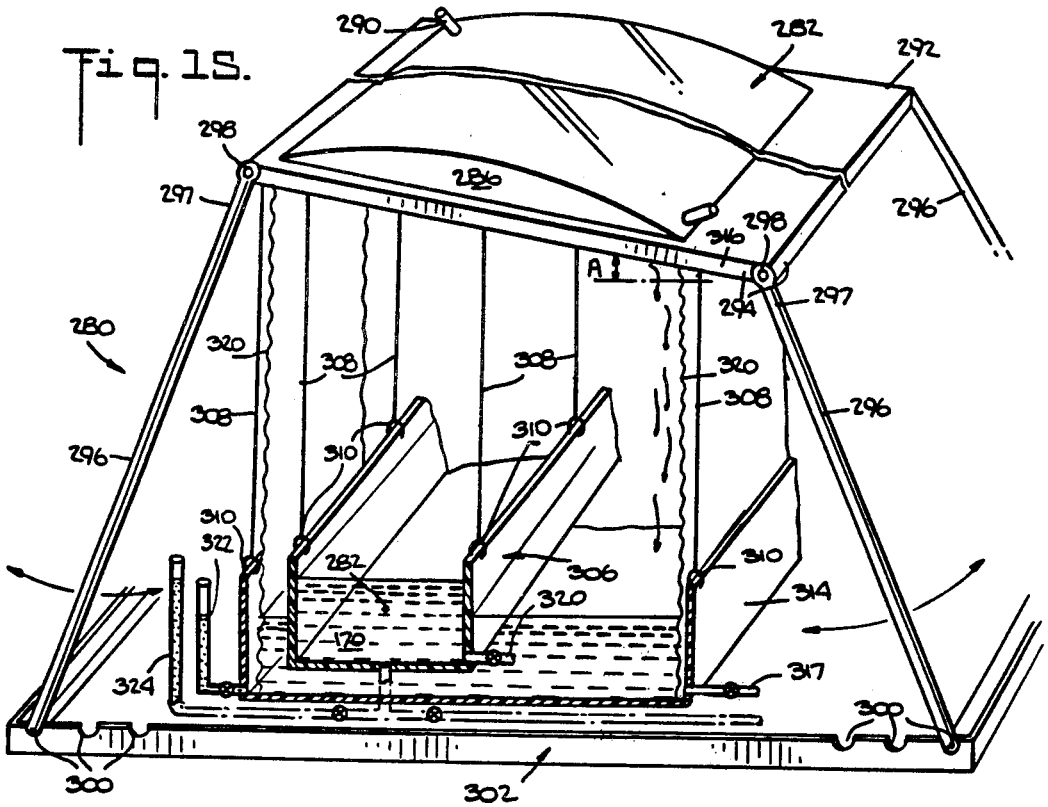
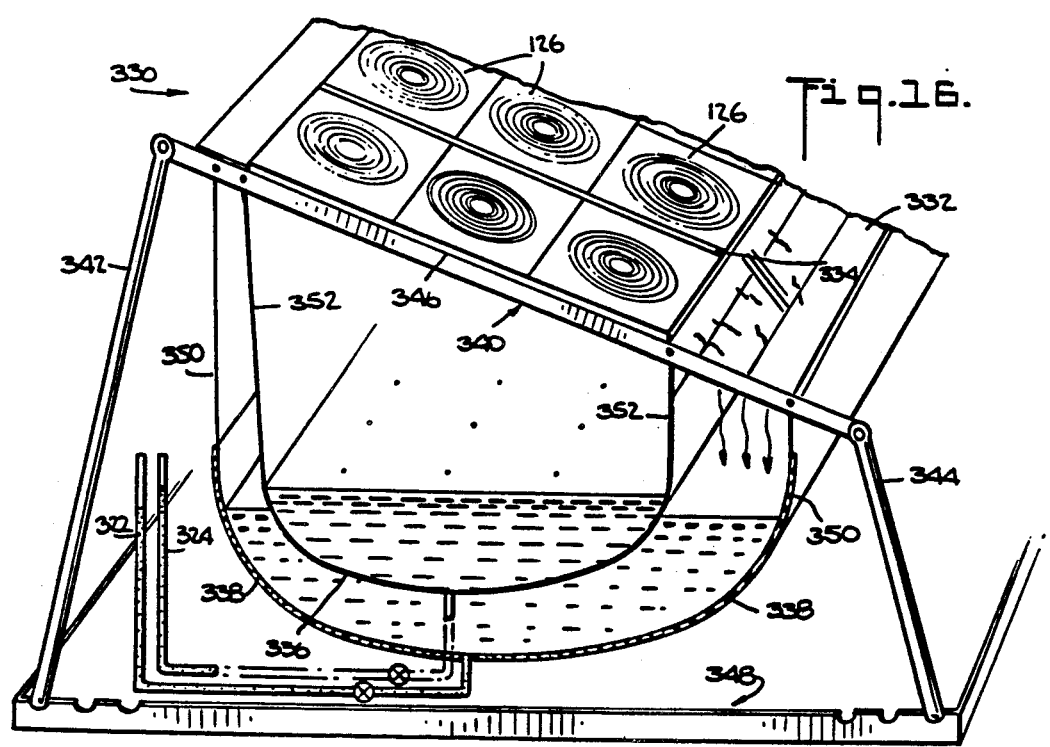

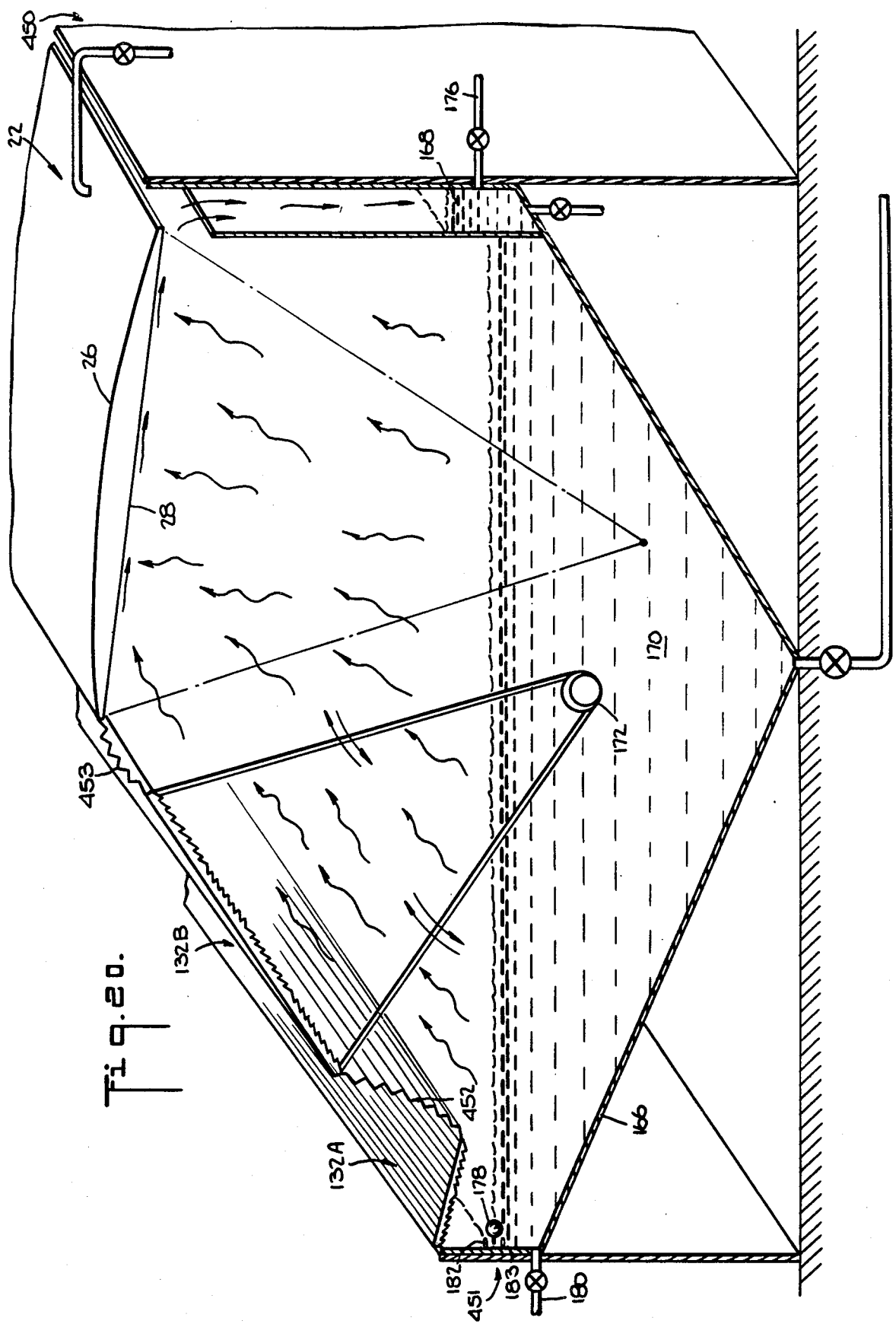

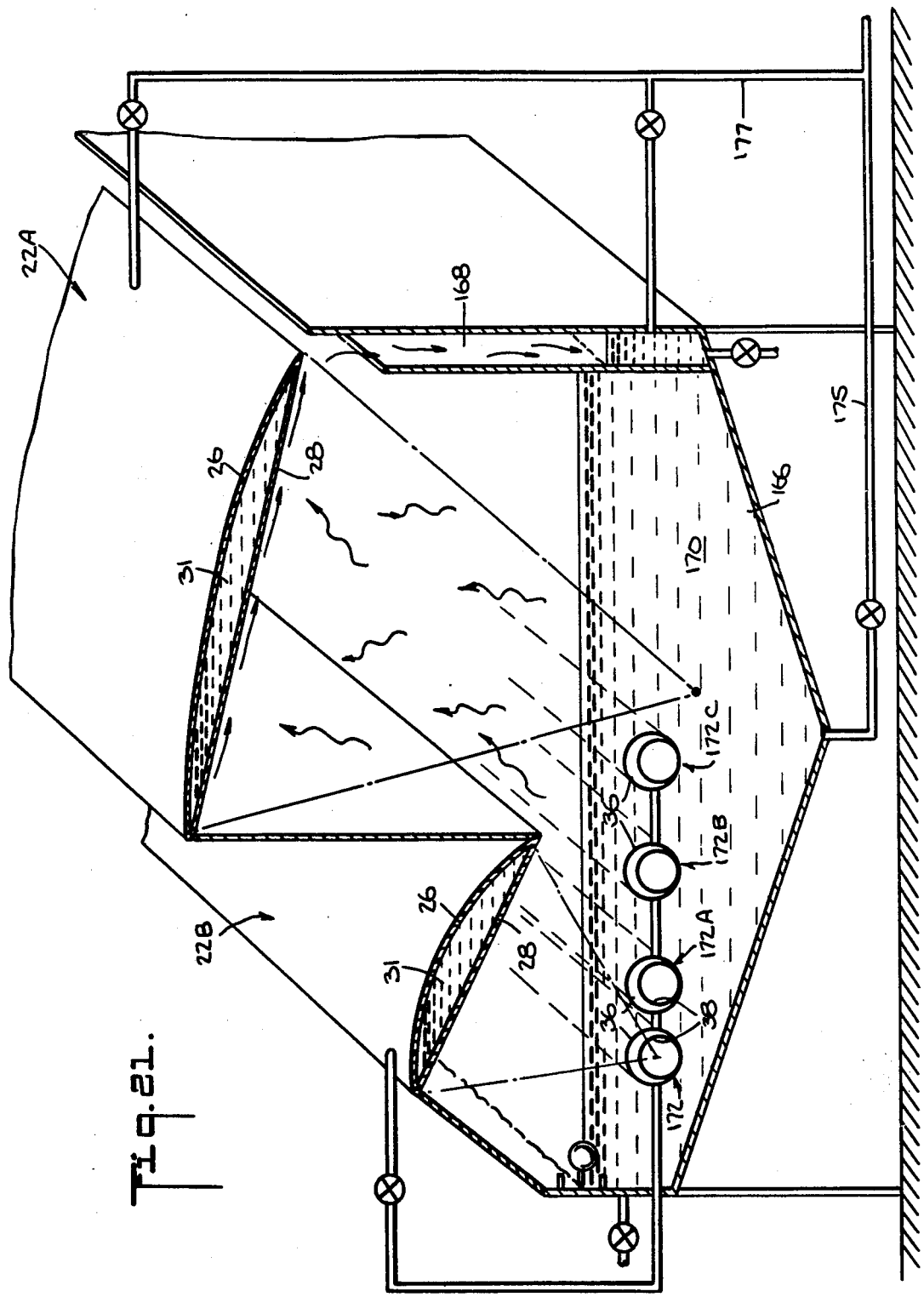

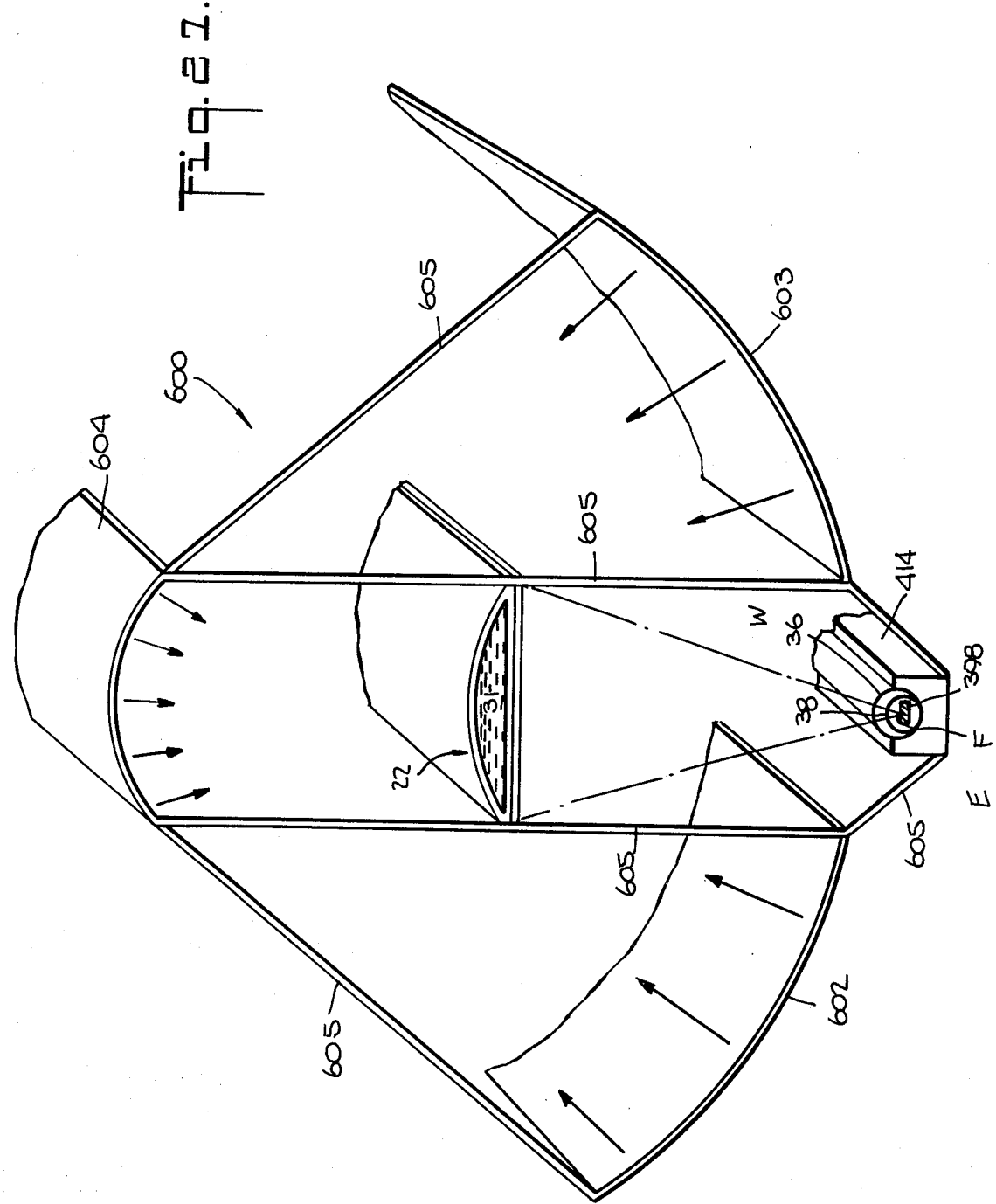

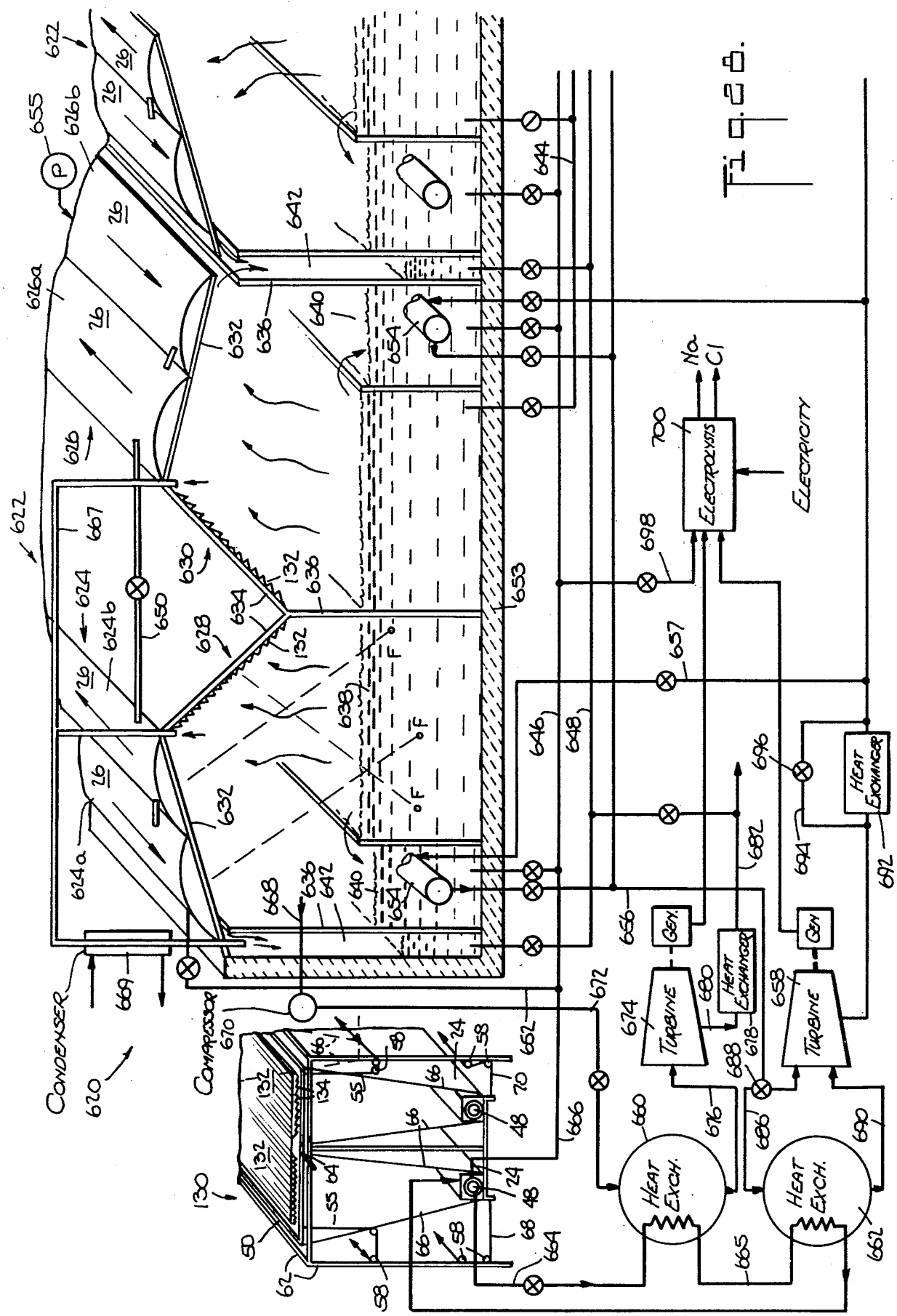

SOLAR DISTILLATION APPARATUS

CROSS-REFERENCE TO RELATED APPLICATIONS

This application is a continuation-in-part of Application Ser. Nos. 810,761 filed June 30, 1977, 807,513 filed June 20, 1977 and 806,291 filed June 15, 1977, Application Ser. Nos. 810,761 and 807,513 being continuations-in-part of Application Ser. No. 806,291, and Application Ser. No. 810,761 being a continuation-in-part of Application Ser. No. 807,513.

BACKGROUND OF THE INVENTION

1. Field of the Invention

The present invention relates to methods and apparatus for concentrating and collecting solar energy for many uses including the conversion thereof to heat energy and/or electrical energy to be used for many purposes. The present invention also relates to the storage and use of heat energy during hours without sunshine or with reduced sunshine. The present invention further relates to methods and apparatus for the treatment of liquids portably and in fixed locations including water containing salt and/or other substances and to methods and apparatus for increasing the production of distilled water in distillation systems which include fluid lenses and preferably Fresnel-type lenses, heat exchangers, turbines and condensers. Additionally, the invention relates to methods and apparatus using fluid and/or Fresnel concentrating lenses and lens systems and elongated collectors comprising at least on fluidcarrying conduit located at the foci of the lenses.

2. Description of the Prior Art

The energy emitted by the sun corresponds to a high temperature in the order of 6000° C., and is emitted in the form of radiation which arrives at the earth with a wavelength distribution comprising about 3% ultraviolet rays, 42% visible light rays, and about 55% infrared rays. It is well known that surfaces exposed to the sun collect at least to some degree the solar radiation and that the absorption of this radiation results in a heating of the material constituting the surface. It is also known that electricity can be produced by photoelectric devices exposed to the sun's rays.

There have been many attempts in the past to collect and utilize pollution-free and essentially nonconsumable solar energy to meet many energy needs. Much attention has been directed to the conversion and utilization of solar energy in the past few years because of the realization that fossil fuels are exhaustible and that a burning of these fuels produces pollution. Solar energy is inexhaustible and available above the clouds at an average energy level of approximately 1350 watts per horizontal square meter. A percentage of this energy, depending on atmospheric and weather conditions, dust, pollution, etc., is available at the surface of the earth during periods of sunshine which vary up to about 4000 hours per year depending on location. Even more recently, the shortage of fossil fuels particularly oil and natural gas and the high cost thereof have sparked new attempts to harness the energy of the sun. Heretofore, however, fuels were a less expensive source of energy than solar energy and the same problems of high capital cost and the cyclic nature of the sun requiring storage capability have heretofore not been satisfactorily solved. For example, refringent lens focusing systems, most using reflecting collectors, have heretofore been used but are uneconomical and impractical because of the high cost involved. A conventional system for obtaining lower temperatures up to about 80° C. consists of dark-colored panels absorbing the solar radiation and means for removing the heat from the panels such as a fluid system circulating a heat-carrying fluid in a heat-exchanging manner with the panels. It is also known to improve the efficiency of these systems by placing one or more glass plates above the panels to produce a greenhouse effect for reducing heat losses. However, the efficiency of these panel systems is low, from about 30% to about 40%, and they require large spaces resulting in large heat losses, and they also require a high capital investment. The use of Fresnel-type lenses and fluid lenses is known in the art for focusing solar energy. See, for example, U.S. Pat. Nos. 3,915,148; 3,125,091; 937,013; 3,965,683; 3,901,036; 60,109; 1,081,098; Japanese Pat. No. 28-2130, and Australian Pat. No. 131,069. However, none of the known systems is capable of converting and storing solar energy efficiently and none can produce heat at an economical capital investment such that the use of solar energy is competitive with other forms of energy. The prior art also does not disclose obtaining temperatures in the order of a few hundred degrees C. while also obtaining at the same time lower temperatures usable for home heating and water heating or other purposes. Nor is there in the prior art a system which is capable of storing heat energy from solar energy during periods of interrupted sunshine for any length of time and which also is capable of providing different temperatures simultaneously and also utilizing the luminous and utilizing or dispersing the heat produced by the infrared rays of the sun.

With respect to electrical generation, it is known that concentrating the solar energy at a photovoltaic cell will increase the electrical output of cell; however, there is the disadvantage that the increased heat in the photovoltaic cell resulting from the concentration will also limit the cell output. Known photovoltaic devices produce a maximum of about one watt per hour per cell. Assuming a cost of $10 per photovoltaic cell, a system using non-concentrated solar energy to generate about 1 kilowatt per hour requires a capital cost of at least $10,000 which is not competitive for normal uses.

With respect to solar stills, known stills used for distillation of seawater have low efficiencies and the cost of heating the water is high as the least amount of heat required to vaporize the water is not recovered from condensation but rather is lost.

In accordance with the invention the prior art drawbacks and disadvantages are substantially overcome and additional advantages realized.

SUMMARY OF THE INVENTION

The present invention relates to methods and apparatus for concentrating, collecting, storing and utilizing solar energy and for lowering the cost and increasing the efficiency of solar energy systems. Refringent lens means concentrate the solar energy along a length at elongated collector means containing at least one fluid therein. The lens means comprise economical fluid and/or Fresnel-type lenses (sometimes referred to as Fresnel lenses) and lens systems which focus the solar energy substantially along continuous lines or in lines of substantially discrete points. Means are preferably provided to maintain the focus lines or discrete foci within conduit means comprising the elongated collector means regardless of the seasonal and preferably also the hourly (daily) location of the sun and/or means are provided for seasonally and preferably also hourly (daily) tracking the sun. Thus, the at least one fluid in the elongated collector means may be efficiently heated to high temperatures in order of a few hundred degrees C.

The fluid lenses comprise upper and lower solar energy transmitting plates which are advantageously separate plates installed in frame means in a fluid-tight manner, or the fluid lenses including the plates may be formed by gluing, welding, extruding, or being blown in a manner similar to that for glass or plastic bottles. The enclosure in the lens containing the fluid may advantageously be communicated with the collector means to enhance performance. The fluid within the lenses preferably has a high index of refraction. The lens fluid and the distance between the lens plates may be chosen to absorb varying amounts of infrared solar energy passing through the fluid. For example, more infrared solar energy will be absorbed using, for example, water as the lens fluid and less will be absorbed using a suitable transparent and colorless chemical product having a high index of refraction. The heat absorbed by the lens fluid may be recovered and used to preheat or heat fluid in the collector means or for other purposes. An antifreeze product may be added to the lens fluid to prevent freezing of the lens fluid when it is used in certain locations. It may be advantageous to absorb infrared radiation in the lens fluid where it is not desired to produce heat from the solar energy at the lens focus such as in certain instances when focusing the solar rays on photovoltaic cells to produce electricity.

The elongated collector means preferably comprises a plurality of fluids, adjacent ones of which are contiguous. The fluids are preferably isolated and disposed in adjacent conduits and the fluids preferably differ and have varying boiling points. The theoretical focus or foci of the lens means are preferably on the surface of or within the higher or highest boiling point liquid. In a disclosed embodiment, the elongated collector means comprises at least two conduits; one of the conduits containing a first fluid having a first boiling point is located within a second conduit containing a second fluid having a second boiling point. Preferably, the solar energy is concentrated at the inner liquid which has a boiling point which exceeds that of the outer liquid. The conduits and fluids are solar energy transmitting or opaque or darkened depending on the location of the lens means focus. By solar energy transmitting it is meant that the solar rays are substantially transmitted through the material. In this way, the fluids may be heated to different temperatures and accordingly can be utilized for different purposes, if desired. Regulation of the fluid flow rates and selection of conduit sizes and shapes assist in providing different temperatures which may be utilized for different purposes. Arrangement of multiple conduits carrying multiple fluids can provide energy for many different uses including vapor and super-heated vapor for mechanical devices and expansion means including turbines, motors and engines; advantageously, the lower boiling point fluid has a low latent heat of vaporization and is useful for this purpose. Additionally, heat is stored in the higher boiling point fluid permitting its temperature to rise during periods of sunshine to a temperature substantially higher than that of the lower boiling point fluid which may be used as a working fluid. Heat is removed from the higher boiling temperature fluid by, for example, circulating the lower boiling point fluid past the higher boiling point fluid.

The invention also provides for the union of individual systems and subsystems to form larger and composite systems. Thus, a high degree of concentration of solar energy and high efficiency are possible. Means may be provided to completely enclose the apparatus while permitting movement of the lens means and collector means to track the sun seasonally or also hourly.

Still further in accordance with the invention, both the infrared and luminous rays of the sun may be simultaneously or individually utilized. Photoelectric cells, specifically, photovoltaic cells, are disposed at the collector means such that the luminous rays are concentrated thereat for maximum electrical energy production while the heat generated by the concentration of the infrared rays is removed by one or more fluids in the collector means whose flow rates and volumes may be regulated. According to the invention, heating at the photovoltaic cells is reduced by utilizing a fluid lens in which the lens fluid and lens plates absorb heat-producing infrared rays which otherwise would be converted to heat at the lens focus at the cells while permitting electricity-producing luminous rays to pass to the cells with little absorption by the lens fluid and plates.

Concentration of solar energy may be increased by using several concentrators arranged to have a common focus. In one embodiment described for producting electricity, this is achieved by employing a central fluid or Fresnel (Fresnel-type) lens concentrating the solar energy in a focus located at the photovoltaic cells and a plurality of Fresnel-type lenses located adjacent the central lens each provided with engravings thereon angled to direct solar energy to the focus of the central lens. Heating of the photovoltaic cells is reduced by utilizing a central fluid lens to absorb infrared energy and by placing the photovoltaic cells in collector means to remove heat therefrom produced by the infrared energy thereat. This arrangement permits high concentration of solar energy with high conversion efficiency to electricity since heating of the cells is reduced. Thus, in accordance with the invention, the solar energy is concentrated by a factor in the order of up to 100 so that one of the known photovoltaic cells is able to produce up to 100 watts per hour instead of, for example, 1 watt per hour during periods of sunshine.

The seasonal elevation position of the sun varies over a total angle of about 47° during the year, the deviation between the equinoxes and each solstice being about 23.5°. This deviation is important and in order to increase solar energy collection throughout the year, sun tracking equipment may be used. For example, in late October at a Latitude of about 43° N, the daily solar radiation received on a stationary horizontal surface is about 300 Langleys while that received by a surface maintained normal to the sun is about 680 Langleys, or more than twice as much. Therefore, it is preferred, as mentioned, that sun tracking means be used or that other means be provided to maximize solar energy reception throughout the year. Both such means according to the invention are disclosed.

In a disclosed embodiment, in which several concentrators are arranged to have a common focus, a system of lenses concentrates the solar energy along a substantially common focal line located in or on the elongated collector means during the different seasons and preferably during the different times of day without using sun tracking means. This system includes an elongated central Fresnel-type or fluid lens concentrating the solar energy along a focal line, and elongated Fresnel-type lenses located adjacent to and at an angle with respect to the central lens, the adjacent Fresnel-type lenses being provided with engravings angled to direct the solar energy to the focus of the central lens. The lenses are oriented so that they are elongated generally in the east-west direction. A given lens or lenses primarily concentrates the solar energy along the focal line for given times of the year. For example, the central lens primarily concentrates the solar energy during the time closely before and closely after the equinoxes while one adjacent lens primarily concentrates the solar energy up to one solstice and the other adjacent lens during the time up to the other solstice. In the embodiment in which the central lens is a Fresnel-type lens, the lens system perferably includes sets of Fresnel-type lenses in the elongated or east-west direction. The Fresnel-type lenses located towards the extreme east and west ends of the lens system are positioned at an angle with respect to the inner lenses so that a given lens or lenses primarily concentrates the solar energy along the focus at given times of the day. However, such lenses may also be located intermediate the east and west ends in a lens system comprised of many lenses oriented along the east-west direction. Thus, at different times of the day and year, one or more lenses will primarily concentrate the solar energy along the focal line without using sun tracking equipment. It is preferred in these embodiments that the elongated collector means comprise two or more adjacent elongated fluid-carrying conduits each of which encloses another fluid-carrying conduit.

According to one aspect of the invention, lower reflectors are disposed below a central reflector and positioned to reflect and preferably concentrate solar energy towards the central reflector. The central reflector reflects and preferably concentrates the solar energy from the reflectors towards the collector means, also disposed below the central reflector. A lens, preferably a fluid lens, is disposed in the path of reflected solar energy between the lower reflectors and the collector. The lens(es) is positioned in the path between the lower reflectors and the central reflector and/or in the path between the central reflector and the collector means, the reflected solar energy being focused in or on the collector means by the lens or central reflector. The reflectors are preferably concentrating reflectors and are preferably cylindrical linear reflectors or paraboic linear reflectors. The reflecting surfaces of the reflectors may be of polished metal, for example, aluminum, and the bodies of the reflectors may be made of epoxy-fiberglass. The reflecting surfaces and the bodies of the reflectors may also be made of glass and other materials. The collector means preferably comprise multiple conduits, one located in another, the central reflector or the lens focusing the reflected solar energy into a substantially continuous and linear focus preferably located in the innermost conduit. In a preferred embodiment according to this aspect of the invention, the lens(es) is a fluid lens(es) located between the central reflector and the collector means and concentrates the solar energy reflected from the central reflector into an elongated focus located in or on the collector means. According to this aspect of the invention, concentration of solar energy may be increased without providing means to track the sun's position, the reflectors and lens being disposed so that the solar energy is reflected and concentrated throughout the year and with at least one of the reflectors seasonally reflecting a substantial amount of solar energy which is focused in or on the collector means. However, to further increase collection, means may be provided to rotate the entire system (the reflectors, lens and collector means) generally about an east-west or longitudinal axis for seasonal tracking of the sun and preferably also about a north-south or transverse axis for daily tracking of the sun. A fluid lens(es) is provided when it is desired to reduce the concentration of infra-red energy at the collector means or to produce heat in the lens fluid of the fluid lens. As mentioned, the lens fluid and the distance between the lens plates may be chosen to absorb varying amounts of infrared energy. If desired, photovoltaic cells may be located in the collector means. Systems according to this aspect of the invention may increase solar energy collection by over 100 times.

The present invention further relates to distillation of liquids in which water or other liquids may be distilled by locating the lens means focus in the water or liquid to be distilled, above which is positioned the lens means and a downwardly sloping substantially smooth, preferably planar surface, whereby the liquid is evaporated and condenses on the smooth surface which carries the condensed liquid to a collecting vessel positioned below the lower side thereof. Preferably, the planar surface is inclined at a slight angle with the horizontal, for example about 15°, and is cooled to enhance condensation thereon. It is preferred that the lens means for the water distilling apparatus comprise a fluid lens which includes and preferably cools said smooth surface. In some embodiments, conduit means are located in the liquid to be distilled. It is preferred that the fluid forming part of the fluid lens is circulated within the conduit means where one is employed to advantageously utilize the latent heat released by the vapor condensing on said smooth surface and transferred to the liquid to be distilled. It is preferred that the lens fluid be the same liquid as the one being distilled, salt water for example, and be circulated in the vessel containing the liquid to be distilled to heat or preheat the liquid in the vessel. In a disclosed embodiment, distillation apparatus includes both fluid and Fresnel lenses in which the fluid lens is fixed and the Fresnel lens is, if desired, movable. The heat released by the condensing liquid on said smooth lens means surface is not lost and returned to the system in the conduit means in the vessel containing liquid to be distilled, or elsewhere, and/or the heat absorbed and recuperated by the lens fluid may be used to preheat or heat the incoming liquid to be distilled in the distillation apparatus or used for other purposes such as producing electricity by superheating suitable low boiling temperature fluids and expanding them in expansion means such as turbines and engines, thereby increasing substantially the efficiency of the system. Additionally, it is preferred that the condensed liquid be circulated in the conduit means in the vessel containing liquid to be distilled or elsewhere to utilize heat contained in the condensed water. The solution of salt (NaCl) dissolved in water absorbs less infrared rays than water alone. Thus, where it is desired to reduce absorption of infrared rays in the lens fluid, a salt/water solution is preferably used as the lens fluid. When desalinating sea water, the sea water is preferably used as the lens fluid and preferably is also introduced preheated into the container holding the water to be distilled.

In the case of sea water, salt may be produced from the resulting concentrated brine and credit obtained from the sale thereof to lower the overall cost of obtaining distilled water. Heat may also be recovered from the heated brine discharged from time to time from the system. According to the invention, combination concentrator systems including both fluid and Fresnel lenses can be advantageously used. In one such combination system, one set of fluid lens concentrators is inclined, for example, south at 15° with the horizontal, with the bottom plates of the lenses being cooled by fluid circulating within the lenses whereby the vapor condenses on the cooled bottom plates and flows therealong into an adjacent vessel. Another set of Fresnel concentrators or fluid lenses are provided to receive the sun's rays during hours of sunshine to primarily heat fluids having high boiling temperatures to over 200° C. in conduit means in the vessel containing liquid to be distilled. The heat in the high boiling temperature fluids is stored and used primarily during periods without sunshine whereby evaporation and condensation of the vapor on the cooled bottom plates of the fluid lenses continues during periods without sunshine. The Fresnel lenses or a separate set of fluid lenses used to heat the high boiling temperature fluids to store heat are preferably provided with tracking means to follow the seasonal and preferably also the hourly location of the sun. According to one embodiment of the invention, the distillation apparatus comprises a plurality of sets of fluid lenses. One set of lenses has a lens plate separation at the point of maximum separation of, for example, one inch for minimum absorption of infrared rays and maximum evaporation of the water to be distilled during periods of sunshine. This set comprises smooth surface bottom lens plates for condensing the vapor thereon which are inclined to flow the condensate into a vessel located below the edges thereof. The lens fluid in this set of lenses will cool the bottom lens plates to provoke condensation thereon. Another set of lenses having a lens plate separation at the point of maximum separation for example of four inches is used for high absorption of infrared rays and contains a high boiling point (for example about 200° C.) lens fluid which is communicated with a plurality of conduits located in the water to be distilled. This set of lenses and conduits is used primarily for storing heat as described hereinbefore to be used during periods without sunshine to continue the distillation. The lens fluids for both sets of lenses recuperate heat absorbed by the lens fluids as described hereinbefore. The use of the different fluid lenses increases production of distilled water and increases the efficiency of the system. According to one embodiment, the lens or lens system focus is located in the water to be distilled such that the location of the focus remains in the water to be distilled with the changing location of the sun. This eliminates the need for means to move the lens or lens system to maintain the focus thereof in or on an elongated collector. In another embodiment of the invention, the still is portable and is easily assembled and disassembled. Advantageously, the stills are operative to distill seawater and brackish water and the portable stills in particular may be used at sea, for example, on life boats, and in desert areas.

In still another embodiment of the invention, the liquid to be distilled, which may be water, is flowed first through fluid lenses and heated or preheated, for example, up to about 70° C. (Water will be used in connection with the further description of this embodiment). The heated water is then introduced into the container containing the water to be distilled where it is further heated by the solar energy concentrated by the lenses, for example, to a temperature which may be about 85° C. to rapidly evaporate the water, the vapor being condensed on the flat bottom plates of the fluid lenses and the condensate flowing off the plates into an adjacent container. The heat recuperated from the released heat of condensation of about 539 kcal/liter (975 BTU/lb) in addition to the heat produced in the water in the fluid lenses by absorption of infrared energy is carried by the water circulated through the fluid lenses. This heat increases the temperature of the water circulated in the lenses, from an influent temperature of, for example, about 20° C. to an effluent temperature which may be, for example, about 70° C. with a predetermined, relatively high quantity and rate of circulation, which may be regulated. The quantity of water circulated through the lenses in raising the effluent water temperature to about 70° C. is many more times (for example, as high as or even higher than about 10 times) the quantity of water evaporated by the solar energy concentrated by the lenses and distilled per unit of time since the water is progressively heated as it is circulated and is therefore circulated faster than it is evaporated. The overall quantity of water evaporated may be up to the quantity of water circulated in the lenses due to heating of the water in the lenses and to heating of the water with heat recuperated elsewhere in the system. In accordance with the invention, means are provided to receive the effluent heated or preheated water circulated through the lenses which is in excess of the water being evaporated. A plurality of fluid lenses is advantageously disposed in parallel, one series of lenses being tilted north and another series of lenses being tilted south. The water is preferably circulated in opposite directions in adjacent sets of lenses of a series to maintain the water temperature in one set of the series of lenses cooler, thereby assisting condensation of evaporated water on the bottom plates of that set. A plurality of Fresnel-type lenses may advantageously be added between the series of fluid lenses, one series being tilted north and another series being tilted south to increase the concentration of solar energy in the water to be distilled for increased production of distilled water. The Fresnel-type lenses facing south are preferably tilted at an angle of 10° more than the angle of latitude of the location of the system to further increase collection of solar energy and reduce heat loses. In a preferred embodiment, water discharged from the lenses into the container containing the water to be distilled and not evaporated or released periodically as concentrated, undistilled water overflows, for example, into adjacent containers. The temperature of the water overflowed into the adjacent containers may be, for example, about 80° C. The heated water in the adjacent containers acts to store the heat obtained by circulation of the water through the fluid lenses which heat may also be used to produce more vapor and more condensate. The heated water in adjacent containers may also be used to evaporate low boiling temperature fluids having low latent heats of vaporization such as Freon (−20.8° C. boiling temperature for Freon 12, 23.8° C. boiling temperature for Freon 11), butane, monochlorobenzine, etc. Freon 12 vapor at 70° C. (158° F.) will have a pressure of about 300 psig (16 atm.) and when expanded in a turbine or engine can produce electrical and/or mechanical power. The low boiling temperature fluid is circulated in heat transfer means inside the adjacent containers, supplied to the turbine or engine and recirculated after expansion in the turbine or engine. The low boiling temperature fluid may be preheated by the water in the adjacent containers to a temperature which may be, for example, about 60° C. Heat transfer means may also be installed in the containers containing the warm condensate, which may be at a temperature of about 80° C., to further increase the temperature and pressure of the low boiling temperature fluid and the power obtainable therefrom. The adjacent containers may also be used to store the heat in the overflowing water, the stored heat assisting in providing substantially continuous operation and increasing production of distilled water. Systems according to this embodiment of the invention may be disposed in parallel to provide a composite system comprised of a plurality of individual systems. In such a composite system, common containers may be provided for the condensate of adjacent units to reduce heat loses and capital expense. Heat may also be obtained directly from solar energy in a separate system and used to heat the low boiling temperature fluid. The fluid heated, for example, to about 60° C. by the recuperated heat, is circulated in a seperated collector of the separate solar energy system which is preferably provided with fluid lenses and/or Fresnel-type lenses as concentrators. The fluid can then be heated to higher temperatures by the concentrated solar energy in high pressure conduits. For example, Freon 12 heated to 100° C. will have a pressure of about 480 psig or 32 atm. Other fluids may be heated to even higher temperature such as over 200° C. The superheated vapor of the fluid can thereafter be expanded in the turbine or engine and produce electricity. The combination of the distillation system and the separate solar energy system produces electricity at high efficiency since the fluid is preheated to about 60° C. by heat obtained from the distillation system. Additionally, the separate solar energy system is preferably movable (lenses and collector) to track the seasonal and daily movement of the sun and is able to improve efficiency by providing large radiation surfaces for the concentrating lenses and the collector which may be more than double those prevailing on the horizontal surface at the location of the system. Providing a separate solar energy system is particularly advantageous since it can more easily be made movable to track the sun in comparison to a distillation system. When distilling seawater, the electricity obtained may be used in the electrolysis of salt to produce sodium and chlorine from the brine remaining after distillation of the seawater. Electricity may be produced in combination with the solar energy distillation of liquids, particularly water, using fluids heated by solar energy and turbines as described above and/or electricity may be produced in combination with distillation using photovolatic cells as described hereinbefore. As mentioned, the quantity of water circulated through the fluid lenses may be ten times greater than the quantity of water that is evaporated per unit of time in order to contain the recuperated the heat of condensation of the water vapor condensing on the bottom plates of the fluid lenses. In the case of seawater, the brine remaining as the water discharged from the fluid lenses is evaporated or overflows will become concentrated with salt and will contain considerable heat. Part of this heat may also be recuperated and used, for example, to preheat the water to be distilled when the brine is discharged from the system from time to time. The salt may be extracted from the brine and considering that the salt may comprise 50% of the weight of the brine, the recovery of the salt is significant. The salt-rich brine may also be electrolysized using in part electricity generated as described above to produce sodium and chlorine. Since 5 kwh of electrical energy per kilogram of chlorine (chlorine comprises about 60% of the weight of the salt) are required in the electrolysis of the brine, additional electricity is required and may be provided from additional systems which convert solar energy to electricity. In the event that not all of the water vapor produced by the distillation system is condensed on the bottom plates of the fluid lenses and a sizable quantity of water vapor is available which may be at, for example, 80° C. or more, the invention further provides for removing vapor from the distillation system, compressing the vapor, heating it to produce steam and introducing the steam into a turbine to generate power, the exhaust steam being condensed by cooling using the water to be distilled and the condensate obtained providing additional distilled water. Additionally, excess vapor may be removed from the distillation system and externally condensed using water to be distilled. The condensed water is discharged into the adjacent container to add to the distilled water produced. Most of the heat of condensation of the condensed exhaust steam and the condensed water vapor is recovered and transferred to the water to be distilled. Preferably the collector of the separate system includes two conduits, one inside the other, with the lens system being focused in the inner conduit as described hereinbefore, a high boiling temperature fluid such as glycerine being circulated in the inner conduit and water to be distilled being circulated in the outer conduit. Further in accordance with the invention, the high boiling temperature fluid, heated for example to a temperature which may be about 250° C., is used to superheat the compressed water vapor to a temperature which may be, for example, about 200° C. The superheated steam is then introduced into the turbine. After superheating the compressed water vapor, the high boiling temperature fluid may also be used to superheat the low boiling temperature fluid to a temperature which may be, for example, about 200° C. after it has been heated to about 60° C. in the adjacent containers and before the fluid is introduced into the turbine as described above.

Lenses may also be combined according to the invention so that the solar rays pass through the lenses serially wherein the focal length of the lenses may be shortened and/or a sharper focus of the lens system may be provided. Bi-convex fluid lenses having convex upper and lower plates may also be provided to shorten the lens focal distance to collector means.

Apparatus according to the invention may be used to electrolyze water and salt recovered from distillation. Hydrogen, sodium and chlorine may be recovered from the electrolysis. The recovery of these products further increases the economic efficiency of the apparatus. Additionally, the hydrogen may be used as a non-polluting fuel or used with carbon monoxide to produce methanol, or with nitrogen of the air to produce ammonia fertilizer and other nitrogen products such as nitric acid and urea.

Still further in accordance with the invention, apparatus disclosed herein for producing electricity may be combined with hydroelectric means and apparatus disclosed herein may be combined with heat pumps and/or refrigeration apparatus and/or expansion means such as turbines, motors and engines.

Still further in accordance with the invention, apparatus and methods having high efficiency and low cost for concentrating, collecting and converting solar energy are disclosed.

These and other aspects of the present invention will be more apparent from the following description of the preferred embodiments thereof when considered with the accompanying drawings.

BRIEF DESCRIPTION OF THE DRAWINGS

The present invention is illustrated by way of example and not limitation in the figures of the accompanying drawings in which like numerals refer to like parts and in which:

FIG. 1 is a schematic perspective diagram showing a system including an elongated fluid lens and an elongated collector, the lens being movable about a transverse axis to track the sun's daytime location and the lens and collector being interconnected and movable about a longitudinal axis to track the sun's seasonal location;

FIGS. 2-4 are cross-section views showing different configurations of fluid lenses;

FIG. 5 is a perspective view showing a series of longitudinally juxtaposed fluid lenses and means for intercommunicating the enclosures of the respective lenses, this arrangement being utilizable to arrange a plurality of longitudinally juxtaposed lenses where a single lens is shown;

FIG. 6 is a detail perspective view of FIG. 5 showing the lens frame;

FIG. 7 is a perspective view of a lens system comprising two separate plates for enclosing a lens fluid and a frame for sealing the plates into a fluid-tight lens;

FIG. 8 is a cross-section view of the lens and frame of FIG. 7 taken along line 8—8;

FIG. 9 is a schematic perspective diagram showing another system in which panels of four fluid lenses each are arranged longitudinally and are focused on elongated collectors, the panels and collectors being interconnected and movable on a shaft rotated to track the sun's seasonal location and the lenses being movable about a common transverse axis to track the sun's daytime location as described in FIG. 1;

FIG. 10 is a plan view of a planar, point-focusing, Fresnel-type lens;

FIG. 14 is a schematic cross-section diagram of a composite system for distilling water comprising individual systems, each comprising a single, elongated, movable fluid lens to follow the seasonal location of the sun and a collector comprising a single fluid-carrying conduit, the individual systems being enclosed and the lenses and collectors being interconnected as described for FIG. 1;

FIG. 15 is a schematic perspective diagram of a portable, easily assembled and disassembled system having a fluid lens for distilling water;

FIG. 16 is a schematic perspective diagram of another portable easily assembled and disassembled system having Fresnel lenses for distilling water;

FIG. 20 is a schematic perspective diagram showing a system for substantially continuous distillation of water in which the lens system comprises Fresnel and fluid lenses and has a plurality of foci located at different depths in the water to be distilled, a Fresnel lens and collector being movable to track the seasonal location of the sun and a set of lenses for preheating the incoming water to be distilled;

FIG. 21 is a schematic perspective diagram showing another system for distilling water in which the lens system comprises two fluid lenses and a plurality of conduits to provide substantially continuous operation;

FIG. 25 is a schematic perspective diagram showing a set of Fresnel-type lenses oriented in the east-west direction with the lenses at the east and west ends angled with respect to the inner lens, a given lens primarily concentrating the solar energy in or on the collector at given times of the day;

FIG. 26 is a schematic perspective diagram of a composite lens system with the lenses positioned and angled as shown in both FIGS. 23 and 25 to concentrate the solar energy in or on the collector both during the different times of year and different times of day;

FIG. 27 is a schematic perspective diagram of a system comprising a central reflector located above a collector and adjacent concentrating reflectors, and a central fluid lens located between the central reflector and collector, the reflectors being disposed to reflect solar energy through the central lens, the lens concentrating the solar energy in a substantially continuous and linear focus located on photovoltaic cells in the collector; and FIG. 28 is a schematic perspective diagram showing a system for substantially continuous distillation of water comprising a plurality of parallel distillation units each comprising two spaced series of fluid lenses of two parallel sets each, each unit having a central container for receiving preheated water to be distilled which is circulated through and discharged from the fluid lenses into the central container, adjacent containers being provided to receive water to be distilled overflowing from the central container, and heat transfer means, turbines, and a separate solar energy concentrator and collector being provided to generate electrical and/or mechanical power from solar energy as well as producing additional distilled water.

DESCRIPTION OF THE PREFERRED EMBODIMENTS

Figure 11:
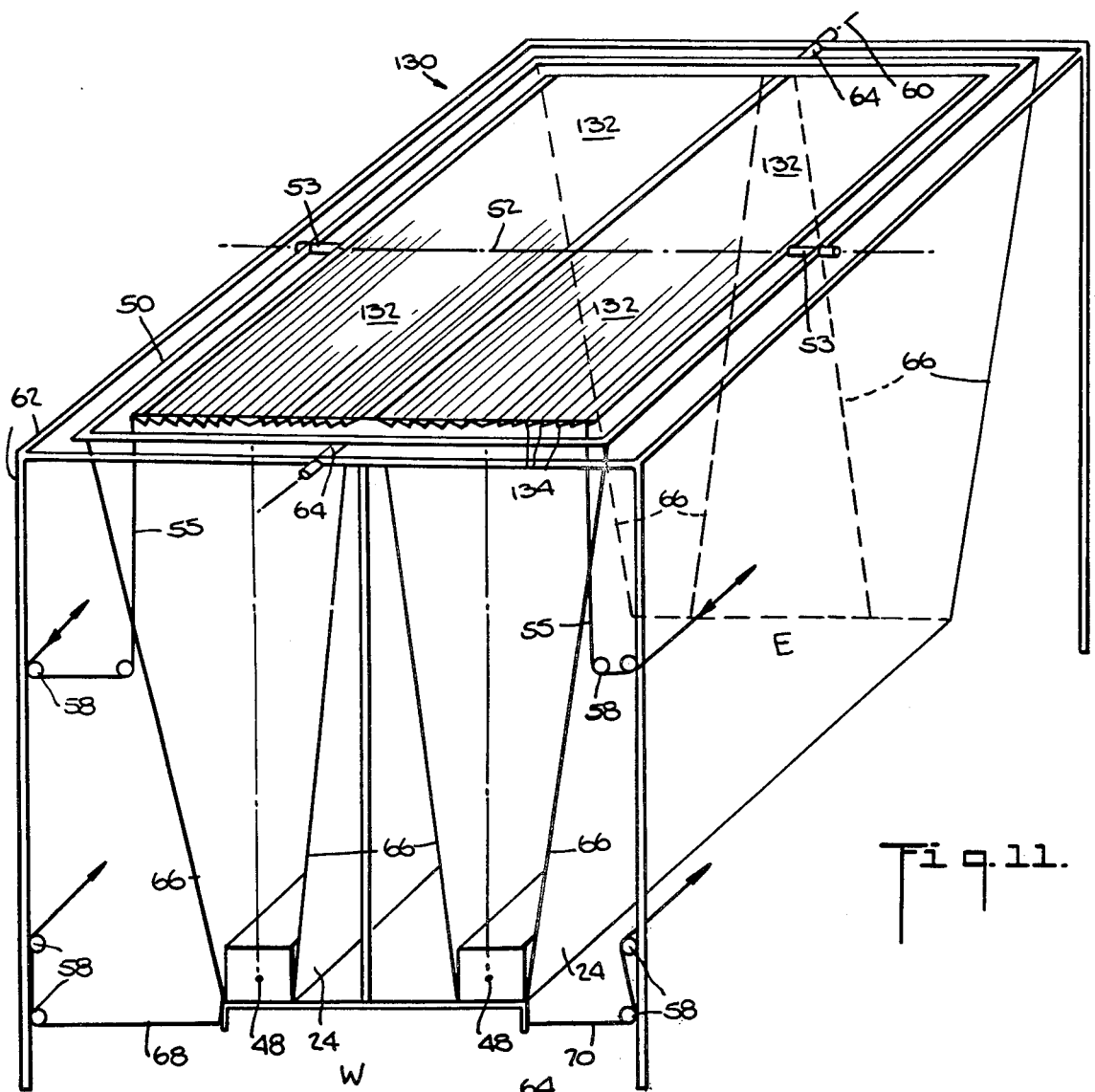
FIG. 11 is a schematic perspective diagram showing another system comprising elongated, planar Fresnel lenses having a linear focus and collectors comprising fluid-carrying conduits, the lenses and collectors being interconnected and movable as described for FIG. 1.

In FIG. 1 is shown a solar energy collecting system comprising a refringent fluid lens concentrator and a fluid-containing solar energy collector. System 20 comprises an elongated fluid lens concentrator 22 and collector 24 in the form of elongated fluid-containing conduits. Elongated fluid lens 22 comprises solar energy transmitting plates 26, 28, which are preferably separate pieces mounted in frame 30 and spaced to enclose solar energy transmitting fluid 31. In the embodiment shown in FIG. 1, upper lens plate 26 is convex and lower plate 28 is planar. The respective sides 32, 34 of lens plates 26, 28 and the ends of the lens plates (not shown in FIG. 1) are sealed to be fluid-tight in manners which will be described hereinafter. Alternatively, means not shown in FIG. 1 for adding and removing or circulating fluid 31 and air are provided in the sides and/or ends of the lens plates. Additionally, lenses may be longitudinally and transversely (radially) juxtaposed and will also be described hereinafter. In the embodiment shown in FIG. 1, collector 24 comprises an outer elongated conduit 36 enclosing an inner elongated conduit 38, both shown to be tubular in shape. Conduit 36 is placed in insulating container 40 and is surrounded by insulating material 42 except for a longitudinally extending opening 44 located above conduit 36. Opening 44 is closed off by solar energy transmitting and heat insulating plate 46. Plate 46 is suitably made of glass or plastic and the insulating material 42 is suitably a foam such as polyethylene foam. A sealing material such as, for example, silicone is provided between plate 46 and container 40 to seal the container fluid-tight. Collector 24 is located below lens 22 and the theoretical linear focus 48 is located at or along the collector. The axis of the lens (and of the system) is oriented along the east-west direction.

Frame 30 and lens 22 are supported by and pivotally mounted in frame 50 to rotate about transverse axis 52 by members 53 and pivot joints (not shown). Cables 55 are connected to opposed sides of frame 30 adjacent sides 32, 34 of the lens, at opposed ends of the lens (only one of which is shown) and wound about rollers or pulleys 58 to run the cables in a common direction towards drive means (not shown). Movement of cables 55 in the direction of the arrows pivots lens 22 about axis 52 moving plate 26 towards the west. Movement of cables connected to the other end of frame 30 (not shown) pivots lens 22 about axis 52 moving plate 26 towards the east. Thus, lens 22 is rotatable in the east-west direction to track the sun's hourly movement. Lens 22 and collector 24 are also rotatable in the north-south direction about longitudinal axis 60 to track the sun's seasonal movement. Frame 50, in which is mounted lens 22, is pivotally mounted adjacent the ends of the lens to supporting frame 62 by members 64 (only one of which is shown) and pivot joints (not shown). Rigidly interconnected to frame 50 is collector 24 by members 66. Frame 50 and collector 24 are rotatable as a unit about axis 64 thereby maintaining the relative orientation between the collector and lens unchanged. Cables 68 (only one of which is shown) are connected to one side of the collector to pivot the lens and collector towards the northerly direction and cables 70 (only one of which is shown) are connected to the other side of the collector to pivot the lens and collector towards the southerly direction to a position such as the one shown in broken lines. Cables 68 and 70 are also would around pulleys 58 to run the cables in a common direction towards drive means (not shown). The lens and collector are rotatable over a total angle of about 47 degrees during the year in the north-south direction. The drive means may comprise, for example, electric motors activated and controlled by sensors such as phototransistors or by, clocks, electric timers, or by computers. Automatic, semi-automatic or manual means may be used to track the sun's location in addition to the one illustrated in FIG. 1 and described above. One system uses an electric motor whose shaft is turned by a small angle whenever the direct or focused sunlight hits a photocell or thermo-couple. Hydraulic systems may also be used to move the lenses and collectors. Other systems use a timer or a weight and pulley device. Movement of the sun affects the electric output of the photocell to control the motor or the motor is controlled by the timer to turn the shaft in small angular increments, or the weight and pulley device turns the shaft. As mentioned, such complete systems for moving the lenses and sensing the sun's position are known and are not shown. Parts of systems used for tracking the sun's position are shown in the drawings. While daily or hourly tracking is preferred to enhance solar energy collection, it is not required since the collector and lens are generally oriented in the east-west direction. By interconnecting and moving the lens and collector, the lens focus is always maintained at the collector regardless of season. The above-described tracking arrangement substantially increases solar energy collection since the system is always oriented in directions directly facing the sun, seasonally and preferably hourly.

As mentioned hereinbefore, the collector is located at the theoretical focus 48 of the lens 22 and in the embodiment of FIG. 1, conduits 36 and 38 are solar energy transmitting, the theoretical focus 48 being located within the inner conduit 38. Conduits 36 and 38 contain heat-carrying fluids 54 and 56, respectively. Since the concentration of the solar energy will be greatest in the fluid within the conduit at which the lens theoretical focus is located, i.e., in fluid 56 within conduit 38, fluid 56 may be heated to a relatively high temperature and is therefore chosen to have a relatively high boiling point, for example, from about 150° C. to about 350° C. Such fluids may comprise by way of example and not limitation lubricating oils, glycerine, mineral oils, paraffin oils, etc. Thus, during periods of sunshine, fluid 56 is heated to a temperature which may be in excess of 100° C., for example, 200° C., the precise temperature attained depending on many factors such as the flow rate of fluids 54, 56, the diameters of conduits 36, 38, sun intensity and position, insulation, heat exchange rates, etc. Fluid 54 is selected to have a boiling point which is less than the boiling point of fluid 56, preferably at least 50° C. less than the boiling point of fluid 56, and preferably in the temperature range of from about −60° C. to about 100° C. Such a fluid is suitably water. It is also preferred that fluid 54 have a low latent heat of vaporization, for example, from about 20 calories per kilogram to about 270 calories per kilogram, and such fluids may comprise by way of example and not limitation refrigerants, solvents, hydrocarbons, alcohol, etc.

In operation, solar energy is concentrated in fluid 56 (chosen to be lubricating oil) within conduit 38 and raises the temperature of the oil to about 200° C. Since the focus to lens 22 is theoretically linear, fluid 56 will be continually heated as it traverses the linear focus. Fluid 54 (chosen to be water) surrounds the oil and conduit 38, and is heated primarily by the oil primarily through conduction. Both fluids, oil and water, are circulated at predetermined rates to obtain desired temperatures and may be used for different heat applications. For example, the water may be heated to about 70° C. to 80° C. or more and used for space and hot water heating. The water may be heated to lower temperatures and used, for example, in swimming pools. The higher temperature oil may be used for applications requiring higher temperatures including industrial applications or may be used merely to heat the water. Since the temperature of fluid 56 increases as it traverses the lens focus, fluids at many different temperatures are realizable by providing taps for fluid outlet and/or inlet at different points along the focus. Fluid 54 may be evaporated and the vapor or superheated vapor used to produce mechanical power in expansion means such as motors, turbines and engines which, in turn, may generate electricity. Preferably, a closed system (not shown) is employed in which the condensed fluid is returned to collector 24. In such applications, fluids such as refrigerants, solvents, hydrocarbons, alcohol, etc., and the like may constitute fluid 54.

As mentioned hereinbefore, a serious drawback of solar energy systems in general and known systems in particular relates to the storage of energy during periods in which there is no sunshine or the intensity thereof is low, as for example during the night or during periods of cloudy weather. Heat is stored for use in those periods in fluid 56 which is heated during normal system operation to a temperature which is at least about 50° C. higher than the temperature of fluid 54. Therefore, even when fluid 56 is not being heated by solar energy or being heated at a reduced rate, it stores heat and will continue to supply heat to fluid 54 due to the temperature difference between the two fluids. Preferably, the circulation of fluid 56 is stopped for those periods. Fluid 56 continues to transfer heat to fluid 54 until the difference in the temperature of the two fluids is relatively small. The time that fluid 56 will transfer and/or store heat depends upon the initial temperature of fluid 56, the difference in temperatures between the fluids, the volumes of the fluid, the characteristics (specific heat, boiling point, latent heat, etc.) of the fluids, the use to which fluid 54 is put, etc.

The fluid 31 in lens 22 may be communicated with one of the conduits in the collector 24 to remove heat from the lens fluid, thereby maintaining it at a suitable temperature while utilizing heat from the solar energy absorbed by the lens fluid to, for example, preheat the fluids circulating in conduits 36 and/or 38.

In FIG. 1, collector 24 was shown to comprise tubular conduits 36, 38. However, the conduits need not be tubular and in some instances other configurations are preferred such as for example, rectangular. A rectangular configuration may be desirable when the theoretical focus has deviations. Providing a rectangular shape will allow movement of focus 48 while still maintaining it at conduit 36. Focus 48 can be on the surface of conduit 36, and in such a case, the surface of conduit 36 need not be solar energy transmitting and is preferably darkened.

It is to be understood that the systems shown in the remaining figures and described hereinafter are longitudinally oriented in an east-west direction and faced towards the sun. It is to be further understood that the elongated lenses or lens system and the elongated collectors and conduits thereof are arranged substantially along parallel longitudinal axes. It is to be still further understood that it is preferred that the concentrators and collectors are movable and that means may be provided for moving them to track the seasonal and preferably the hourly location of the sun. Movement of the lenses, however, may not be required where the lens focal length is short such that displacement of the focal line will be small from season to season and remain within the periphery of the inside conduit 38 of the collector. Manual, automatic or semi-automatic drive means for effecting tracking movement of systems and/or lenses on a seasonal or hourly basis are known. While only part of a single lens is shown in FIG. 1, it is to be understood that many lenses may be longitudinally and transversely located.

Conduits 36 and 38 in FIG. 1 may both include opaque heat conducting surfaces and the lower part of the surface of either conduit 36 and/or conduit 38 is preferably darked by black paint or the respective conduit or conduits are preferably provided at the lower half of the surfaces thereof with black metallic sheets to prevent transmission of solar energy and to enhance heat absorption from the solar energy.

Additionally, plate 46 provides a greenhouse effect in the collectors, and container 40 is preferably made of insulating material to further reduce heat losses. The reduction in heat loss is especially important during periods of no or reduced sunshine. However, as will be described more fully hereinafter, plate 46 may be eliminated when it is not desired to retain heat at the lens focus such as when photovoltaic cells are located thereat. It is preferred that the theoretical focus of the lenses be located at the inner fluid to further reduce heat losses since the outer fluid will act as an insulator. The solar energy transmitting tubes in FIG. 1 are preferably made of colorless and transparent glass or plastic and the tubes which need not transmit solar energy therethrough are preferably metal, preferably steel, copper or aluminum, and all are preferably darkened at their lower surfaces.

The area of the collector surfaces may be much smaller than the area of the concentrators and may be only from about 1% to about 10% of the area of the conventional flatplate collector, thus reducing the heat losses accordingly. As less material is required in the collector, the cost will be reduced.

The collector systems may comprise a number of conduits other than two and configurations other than tubular, and the lenses and lens systems may be other than that shown in FIG. 1.

Figure 2S:
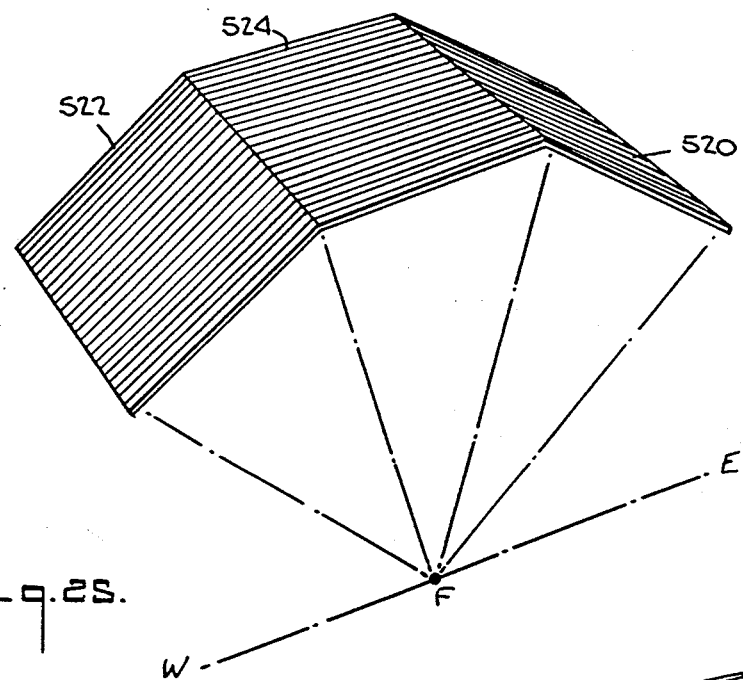
Figure 2B:
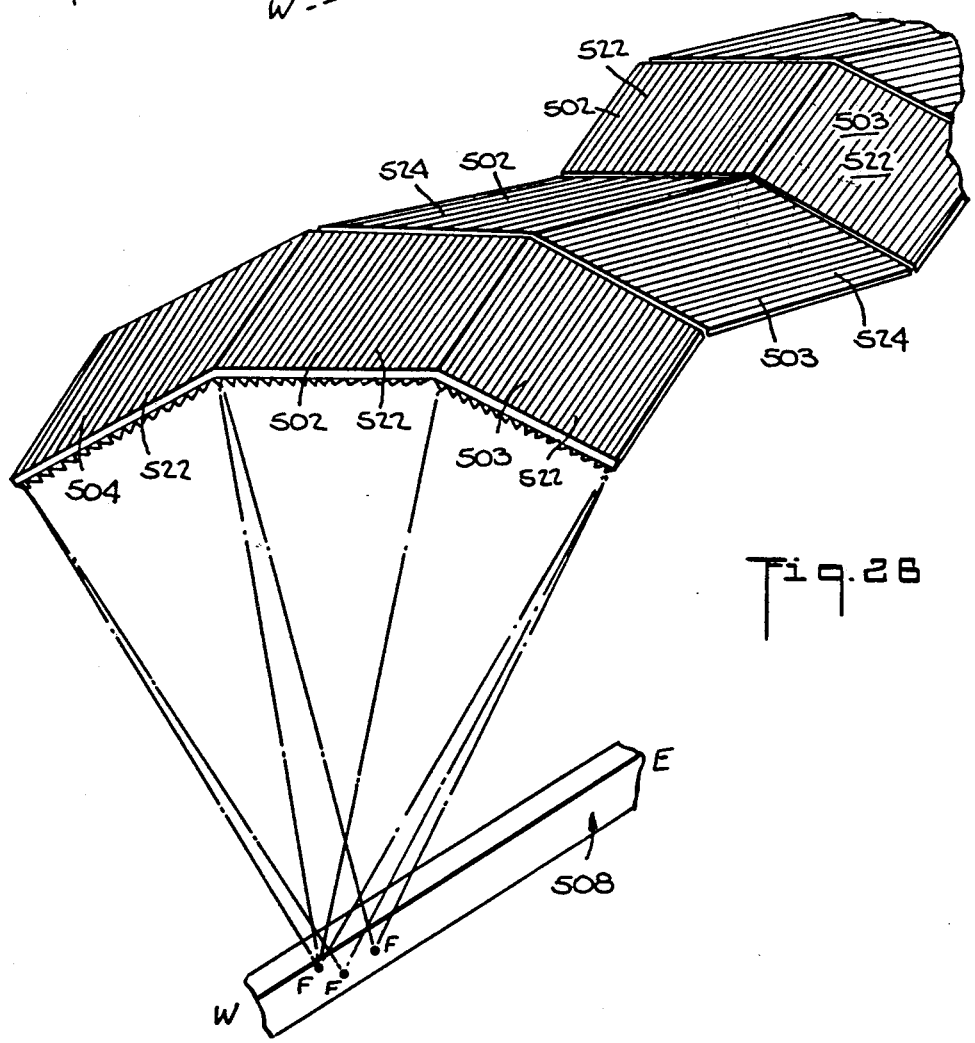

Referring now to FIG. 2–8, the fluid lenses may have configurations other than that shown in FIG. 1. In FIG. 2 is shown planar-convex lens 22 comprising curvilinear upper plate 26 and spaced planar lower plate 28 enclosing solar energy transmitting fluid 31. The plates may be economically made of glass or plastic and are joined at sides 32, 34 in a fluid-tight manner as by welding or gluing. Alternatively, lens 26 may be extruded with sides 32, 34 integrally joined. The ends of the lenses may similarly be glued, welded or extruded. FIG. 3 shows a bi-convex lens 78 comprising spaced curvilinear plates 26. Lens 78 is formed as described for lens 22. This configuration may reduce the focal distance to a collector. Lens 80 shown in FIG. 4 comprises curvilinear upper plate 82, spaced planar lower plate 84 and side wall 86. Lens 80 is economically formed from a bulb of glass or plastic as by blowing as, for example, in the manufacture of glass or plastic bottles. The lenses shown in FIGS. 2–4 when used in solar energy systems are supported by suitable frames and structural members. For example, lens 80 is supported by frame 88 shown in FIGS. 5 and 6. As there shown, a plurality of lenses 80 are longitudinally juxtaposed at ends 90 and supported by longitudinal support stringers 92 and transverse support stringers 94. The lenses may be secured to the frame by, for example, adhesives. As shown in FIGS. 5 and 6, the theoretical focus 96 of the lenses is at and along collector 98. Means in the form of openings 100 are provided to add and remove fluid 31 and/or air and the openings may be communicated by, for example, tubes 102 to provide for circulation of the fluid. The openings may be provided in other locations, for example, as shown in FIGS. 2–5 and referenced by 100. As mentioned hereinabove, the plates forming the lenses may be integrally extruded or blown or may comprise separate plates joined as by welding. Referring now to FIGS. 7 and 8, upper cirvilinear plate 26 and lower planar plate 28 are separate pieces and are joined in a fluid-tight manner by means of frame 104. Frame 104 comprises two longitudinal grooves 106, 108. The upper groove 106 is curvilinear and sized to accommodate upper curvilinear plate 26 while the lower groove is linear and sized to accommodate planar plate 28. The edges of the respective separate plates are inserted into the respective grooves along with sealing material 110. The ends of the plates are similarly joined. The material 110 may comprise a gasket or similar flexible piece and/or or deformable material such as silicone to form fluid-tight joints. Thus, the lenses according to the invention in which two independent plates are joined or the lenses are extruded or blown, are relatively easy to manufacture and are relatively inexpensive. The required radius or curvature of the curvilinear convex plate and the focal distance to the collector from the lens will depend on the width of the plates, the maximum distance between the plates and the refractory index of the fluid between the plates, and fluids with higher refractory indices shorten the required radius and focal distance.

Depending on the lens fluid used and the distance between the lens plates, a percentage of the infrared rays in the wave length range of about 0.7 to about 4 microns impinging on the lens will not pass through the lens. Some of the infrared rays will be absorbed directly by the fluid and heat it. Some of the infrared rays will be absorbed by the lens plates which will be heated and in turn partly heat the fluid. Part of the solar energy will be reflected by each plate, part of the reflected solar energy being reflected towards the inside of each plate into the lens to also be partly absorbed by the lens fluid. Little of the luminous rays in the wave length range of about 0.25 to about 0.7 microns will be absorbed in a transparent and colorless lens fluid and transparent and colorless lens plates. For certain applications, it is desirable that the absorption of infrared rays be minimized, for example, where it is desired to produce as much heat as possible at the lens focus. In other applications, it may be desirable to heat the lens fluid and/or provide as little heat as possible at the lens focus while transmitting as much as possible of the luminous rays such as, for example, when photovoltaic cells are located at the lens focus. In the former case, the distance between the lens plates is minimized, for example, to about 1 inch at the point of maximum separation of the lens plates, and the lens fluid is chosen to absorb at ambient temperature a minimal amount of infrared rays and preferably has an index of refraction of at least 1.35. Fluids such as hydrocarbons, mineral oils, solvents, solutions such as salt water, etc. are transparent, colorless and absorb substantially less infrared radiation than water. When used, the fluids are preferably chosen to be non-corrosive to glass and plastic and to have a suitable boiling temperature. Some fluids having a high index of refraction and low absorption of infrared rays such as trichloroethylene and toluene are corrosive to plastics such as acrylic plastics. When using such corrosive fluids, the lens plates exposed to the fluid are covered by sheets such as Teflon or coatings of epoxy such as Lucite RD which are not corroded by the lens fluid. In the latter case, the distance between the lens plates is maximized, for example to about 4 inches at the point of maximum separation of the lens plates, and the fluid is chosen to absorb at ambient temperature a maximum amount of the infrared rays while still being transparent and colorless. The degree of absorption of infrared rays is also dependent upon the material used for the lenses. For example, for low absorption, waterwhite glass with about 1.5% absorption or plastic with a similarly low absorption may be used with a lens fluid such as a salt water solution. Where a high degree of absorption of infrared rays is desired, for example, in electricity-producing applications wherein the solar energy is focused on photovoltaic cells, glass and plastic lenses with lens fluids having an infrared absorption of, for example, 20% may be used. It is preferred that water be used in the latter case where it is desired to absorb infrared radiation. In certain locations, an antifreeze product is added to the water to prevent freezing. If water is used in the collector, an antifreeze product is also added to the collector water. With water used as the lens fluid and the larger distance (for example of 4 inches) separating the lens plates, there will be an increased absorption of the infrared rays by the lens fluid and a corresponding increase in heating of the lens fluid. The heat in the lens fluid can be recuperated in heat exchangers and used for heating and/or preheating the collector fluids as described hereinbefore. The heat may also be used to heat water for domestic use or for other uses, or to heat buildings, or to produce electricity by superheating low boiling temperature fluids and expanding the vapor in expansion means such as turbines or engines. Since the lens fluid permits most of the luminous rays to be transmitted therethrough, electrical generation by the photovoltaic cells will be essentially undiminished while the lens fluid is being heated and the heat being used as mentioned for heating and/or production of additional electricity. Thus, the invention provides a highly economic combination of simultaneously generating heat and electricity.

Referring now to FIG. 9, system 70 is made up of panels 71 of fluid lenses 22. Each panel comprises four fluid lenses 22 arranged transversely and longitudinally adjacent one another. The panels are supported and rotatable to track the sun seasonally and hourly. Frame 50 is supported on shafts 64 which are rotatably connected to frame 62 at opposite ends of the frame by means such as bearings. One end of one of the shafts 64 is connected to drive means (not shown) such as an electric motor. Lenses 22 and frame 50 are rotatable about longitudinal axis 60 by rotating shaft 64 to track the sun seasonally. Frame 30 is pivotally connected to frame 50 by members 52 and is movable with lenses 22 about the common transverse axis 53 to track the sun's position as described for FIG. 1.

In FIG. 10 is shown a plane refringent element 126 comprising a rigid frame 128 surrounding a sheet or plate of plastic or glass material 130 in which are formed by impressions or molding concentric, closely spaced rings or microprisms 132 whose pitch, for example, corresponds to about 3 to about 4 microprisms per millimeter. The plane refringent element 126 acts like a plane Fresnel lens. Solar energy striking the refringent element 126 is concentrated by the microprisms into a theoretical point focus (not shown). Refringent element 126 may be positioned longitudinally juxtaposed as the fluid lenses in FIG. 5 and/or transversely juxtaposed as the lenses in FIGS. 9 and 13. The system may be arranged so that the point foci of lenses 126 are located within or at the surface or conduits 36 and 38, the series of discrete point foci along a length forming in effect, a linear focus composed of discrete point foci.

System 130 of FIG. 11 is shown employing elongated refringent elements 132 having longitudinal microprisms 134 acting as longitudinal Fresnel lenses. The lenses 132 and collectors 24 are arranged so that the linear focus of a column of lenses is located at a respective collector as described for FIG. 9. The lenses and collectors are interconnected and movable as the systems shown in FIGS. 1 and 9.

Figure 12:
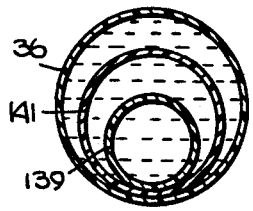
FIG. 12 is a cross-section view of part of another collector comprising three fluid-carrying conduits in which the innermost conduit is enclosed by the intermediate conduit which is enclosed by the outermost conduit.

FIG. 12 shows an arrangement for three conduits in which the inner conduit 139 is enclosed by intermediate conduit 141 which in turn is enclosed by outer conduit 36. Providing three conduits permits use of three different fluids, allows for use of the fluids at varying temperatures for many different applications and allows for a larger displacement of the focal line.

The present invention may be utilized for many energy applications as described hereinbefore and may also be advantageously used to distill or otherwise treat water by evaporation and condensation thereof. Typically, the water is seawater or brackish water and is to be desalinated, or water or a liquid containing minerals or other substances, or water such as industrial waste water or polluted water which is to be purified and distilled. The refringent concentrators and collectors are arranged in systems operative to distill water, preferably recovering the heat of condensation and preferably recovering heat in the condensed water and discharged brine as described hereinafter. Embodiments of such systems are shown in FIGS. 13, 14, 15, 16, 20 and 21.

Figure 13:
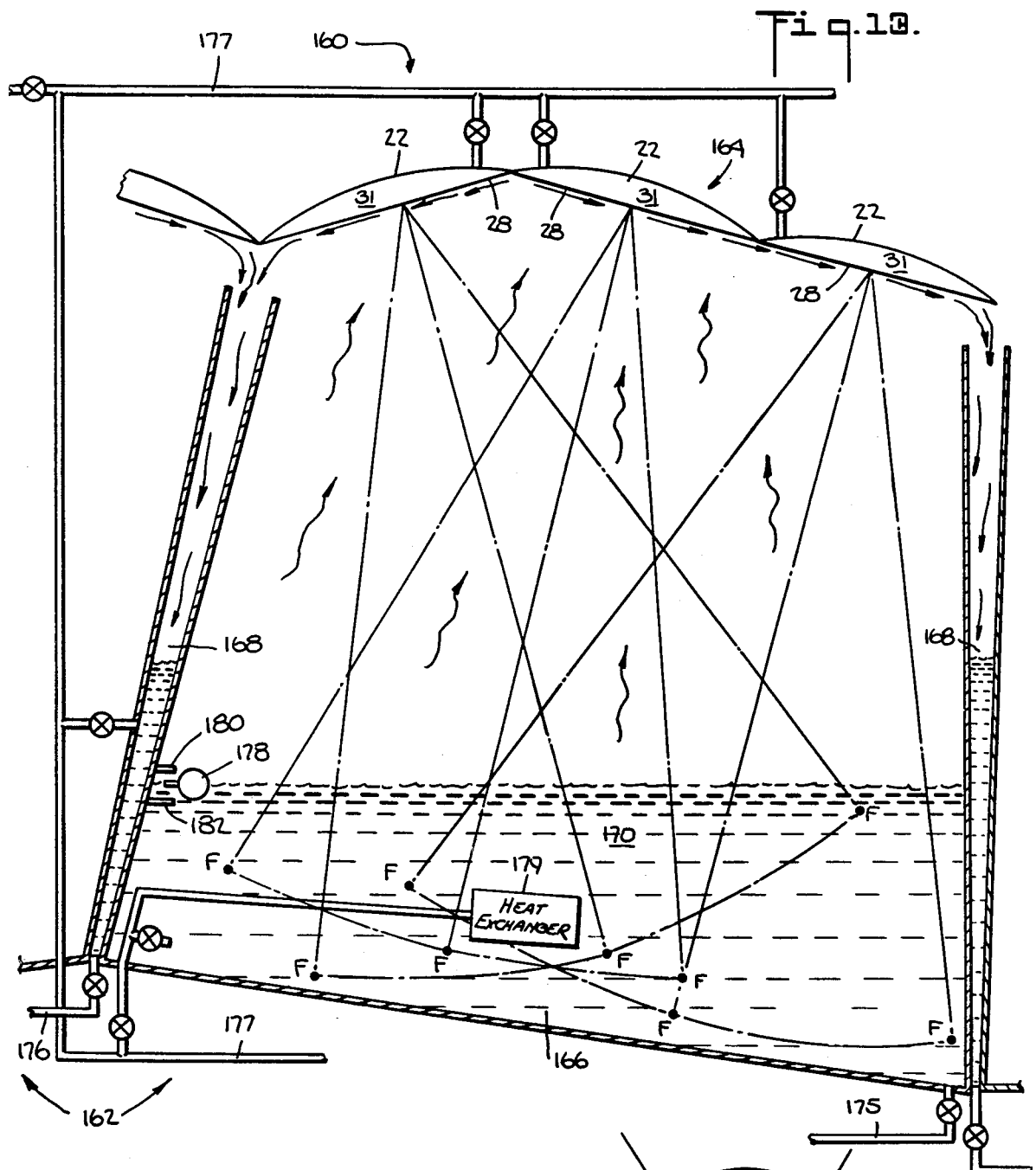
FIG. 13 is a schematic perspective diagram of a composite system for distilling water comprising individual systems each including three elongated fluid lenses, two lenses being located on the same plane and the third at an angle to the two, the foci of the lenses being located in a vessel containing the water to be distilled at different locations therein.

The system 160 shown in FIG. 13 comprises a plurality of sub-systems 162, each employing a three lens arrangement 164. Each lens system 164 is supported above an elongated, central, channel 166 and parallel, elongated, side channels 168 such that the central part of the lens system is above the central channels and the outer longitudinal edges of the outer two lenses are above the side channels. Each lens is inclined and the bottom lens plates 28 are planar. The water 170 to be distilled is filled in the central channel to a predetermined height. Within channel 166 are located the elongated foci F of the lenses, preferably at different locations and different heights, the different heights corresponding to different water depths in channel 166. In FIG. 13, lens fluid 31 is advantageously salt water. The solution of salt (NaCl) dissolved in water absorbs less infrared rays than water alone. Thus, where it is desired to reduce absorption of infrared rays in the lens fluid, a salt/water solution is preferably used as the lens fluid. When desalinating sea water, the sea water is preferably used as the lens fluid and preferably is also introduced preheated into the container holding the water to be distilled. Valving is provided in the conduits to control draining and to regulate circulation of the fluids. In operation, the water 170 to be distilled is heated due to the solar energy concentrated at foci F and the water 170 is vaporized. The vapor strikes the lower plates 28, is condensed thereon and flows therealong to be discharged at or dropped from the edges thereof into side channel 168. The interiors of the fluid lenses are communicated with the interior of channels 166 by conduits 177 (only one set of which are shown) as well as being intercommunicated. Heat exchange means 179 may be provided inside channel 166, particularly for transferring heat from the condensed water in channel 168 to the water in channel 166. The water in the fluid lenses is circulated through the lenses and channels. In this way, the heat released by condensation of the vapor is transmitted through plates 28 to the water in the lenses and the heat absorbed by the water in the lens from the condensing vapor is returned to the system in the channels. Thus, the water to be distilled may be heated or preheated. The lenses 22 are arranged so that the foci F remain within channels 166 regardless of the seasonal and daytime location of the sun, the foci moving along the paths indicated in channel 166 by the broken lines. Thus, the foci will not be displaced outside channels 166 and it is therefore not necessary to provide means to move the lenses to follow the location of the sun. Heat in the distilled water may also be utilized to preheat or heat the water to be distilled. The distilled water may only be a few degrees less than the vapor temperature. The recovered heat may also be used for other purposes and the lens fluid and/or condensate can be circulated through heat-exchanging means to remove the heat therefrom. This is significant because the latent heat required to vaporize the water 170 of about 540 calories per gram in addition to the sensible heat are released by condensation of the vapor and are substantially recuperated from the condensate and substantially returned to the system by the circulated water in the lenses upon which the vapors condenses. This latent heat and the sensible heat are substantial and would otherwise be lost. This results in much higher efficiency of the system compared with solar stills where channels filled with water to be treated are covered with only glass or plastic plates or sheets which receive the solar rays. Circulating the water in the lenses also cools the lower lens plates 28 thereby assisting condensation thereon. Conduits 175 and 176 are provided for filling and emptying the respective channels. The water 170 to be distilled may be held between predetermined heights by a float system comprising float 178 and relays 180 and 182. Movement of the float activates respective relays to start and stop a pump or motor valve (not shown). A similar arrangement may be used in side channels 168 or a gravitational drain arrangement may be employed to maintain the height of distilled water in the side channels between predetermined heights. The respective channels are communicated to provide approxmately equal levels in each of the respective channels. Advantageously, the channels are made of concrete or asbestos cement and are preferably insulated on the outer sides. Means other than the lens itself may be used to condense the vapor such as substantially smooth preferably planar plates located below the lenses 164. In such a case, the lens fluid may not recover substantially all of the latent heat unless the plate is proximate thereto. Alternatively, means associated with the plate may be used to recover the latent heat.

The system shown in FIG. 13 is substantially enclosed by the channel panels to reduce heat loss. The recovery of the latent heat of the condensing vapor by the lens fluid and the recovery of the sensible heat in the condensed water assist in providing a continuous operation system since heat losses are reduced. Additionally, as mentioned, by removing from the lens fluid the heat of condensation recovered by it, for example, by circulating it in channels 166, the lens fluid will be cooled, in turn cooling the lower lens plate and assisting in condensing any vapor impinging thereon. As described hereinbefore, the lens fluid will be heated by direct and indirect absorption of infrared radiation and by heating of the lens plates, and this heat may also be recovered from the lens fluid. The heat recovered from the lens fluid and condensed water may be used to preheat water to be distilled before entering channel 166 or to preheat and heat the water to be distilled in channel 166 by heat exchange means. The efficiency of the system can be further increased by recovering the heat contained in the brine discharged from channel 166 from time to time. The heat which is recovered from the condensing vapor, the condensed water, the brine and the lens fluid can be used for other purposes such as producing electricity by superheating and expanding fluids having low boiling temperatures and low heats of vaporization. The water distillation systems described hereinafter operate in similar manner and description thereof will therefore be more limited.

In FIG. 14, an expandable material forms the side panels 206, 208 of each compartment 210 of the system. Advantageously, the material is of plastic. Opposed ends 212, 214 of adjacent side walls 208, 206 are secured to respective sides of lenses 22. Adjacent interior side walls are of one piece and are advantageously formed as a single sheet 216. Sheet 216 is wound partially about the circumference of tubular members 218 which extend along longitudinal axes parallel to those of the channels 220, 222. The tubular members are secured by means (not shown) to maintain sheets 216 as side walls 208, 206 as shown. The lower sides 211 of lenses 22 terminate above channels 222. The evaporation and condensation of the water proceeds as described hereinbefore. In addition to the system being enclosed condensed water flows down side panel 208; and side panels 206, 208, when cooled by the outside environment, will provide additional condensation of vapor which will flow down panel 206 as well. The system remains enclosed upon movement of the lens as follows. If the lenses are rotated counterclockwise, interior side panels 206 move downwardly and interior side panels 208 move upwardly about tubular members 218. The exterior side panels 206a and 208a are secured to the sides of respective channels and are made of an expandable material. Lenses 22 and collector 188 are communicated by conduits 219 and valves 221 (only one set of which is shown). The water in the fluid lenses may thereby be circulated in collector 188. In this way, the heat released by condensation of the vapor is transmitted through the plate 28 to the water in the lenses and the heat absorbed by the water in the lens from the condensing vapor is returned to the system. Thus, the water to be distilled may be heated or preheated and fluids in the collector may be heated or preheated. Heat in the distilled water may also be utilized to preheat or heat the water to be distilled or fluids in the collector by means of conduits 223 (only one set of which is shown) and heat exchange means, and circulation of fluid therethrough or elsewhere. The distilled water may only be a few degrees less than the vapor temperature. The recovered heat may also be used for other purposes and the lens fluid and/or condensate can be circulated through heat-exchanging means to remove the heat therefrom. Of course, whether conduits 219 or conduits 223 or both are used will depend upon the lens fluid used, the fluid used in collector 188 and the arrangement of heat exchange means.

Referring now to FIG. 15, a portable water distillation system 280 is shown comprising single vessel 306 holding the water 170 to be distilled. The system is easily assembled and disassembled. Lens 282 is made of flexible solar energy transmitting material such as clear plastic and forms an enclosure 286 when inflated by a fluid, advantageously water, which is introduced and removed and/or circulated by means including inlet 288 and outlet 290. Air is also removed and fluid introduced through said means. Also, fluid and Fresnel (circular or longitudinal microprisms) lenses as described hereinbefore may be used. Lens 280 is supported by frame 292 of metal or other suitable material which comprises upper frame members 294 and side support members 296. The upper ends 297 of the side support members 296 are pivotably connected to the upper frame members 294 as by bolts 298 such that each of the side support members is pivotable about the bolts in the directions indicated by the arrows. Means such as indentations 300 are provided in platform 302 to secure in the lower ends 304 of the side members in selected positions. Alternatively, a platform is not used and ends 304 may be secured in the ground or otherwise. Pivoting of side members 296 adjusts angle A at which lens 282 is inclined. The elongated vessel 306 advantageously collapsible and made of lightweight plastic is hung from frame members 294 below the central part of elongated lens 282 by cables or rope 308. Hinges 310 are provided to secure the cables to the vessel. Adjustment of angle A and movement of cables 308 permit the lens focus to be positioned in vessel 306 during different seasons. A collecting vessel 314 is located below vessel 306 and below the lower inclined end 316 of the lens 282. Vessel 314 advantageously collapsible and made of lightweight plastic is also hung from upper frame members by cables or ropes 308 and hinges 310. Vessel 314 is inclined preferably along the longitudinal direction to assist in draining treated water therefrom by means such as valve 317 in outlet 318. Port 320 is provided in vessel 306 for filling and emptying. Distillation of water 170 by heating of the fluid in conduit 312, advantageously water, and evaporation of the water, condensation of the vapor on the lens and collecting of the condensate proceed as described hereinbefore. Expandable side panels 320 may be provided to enclose the system and allow for movement of lens 282 as described hereinbefore and may be used to form collecting bags as shown in FIG. 14. Means are provided to indicate the water levels in the vessels 306, 314 such as vertical transparent glass or plastic tubes 322, 324 located outside side panels 320 and connected by tubing with the bottoms of the vessels.

In FIG. 16 is shown another embodiment of a portable water distillation system 330 which is easily assembled and disassembled. System 330 comprises planar Fresnel Lenses 126 of the type shown in FIG. 10 having concentric microprisms causing the solar energy to be concentrated at point foci. A longitudinal Fresnel lens or lenses may also be used. Lenses 126 are longitudinally and transversely juxtaposed to form a composite lens assembly of six Fresnel lenses which is inclined with respect to the horizontal, six being chosen for purposes of illustration. The lenses are formed into an assembly by, for example, securing them as by adhesives to a solar energy transmitting glass or plastic plate 332 which, in the case of plastic, may be folded along flexible partition lines 334. Each Fresnel lens may be about 9 inches by about 7 inches and are presently available at a cost of about $0.40 each. The point foci of the lenses are located in the water to be distilled in flexible container or bag 336 made of plastic or other pliable material. Flexible container or bag 338 made of plastic or other flexible material located below and extending beyond container 336 is used to collect condensate from plate 332. The lens assembly and containers are supported by support assembly 340 comprising pairs of legs 342, 344, frame 346 and platform 348. The legs are pivotably connected to frame 346 as described for FIG. 15 to adjust the angle of incline of the lens assembly to follow the seasonal location of the sun. The containers or bags have side panels 350, 352 which extend upwards to plates 332 to form an enclosed system as described hereinbefore. An opening is provided in side panel 352 at the lower side of plate 332 to allow the condensate to drop into the collector bag 338. Means such as transparent tubes 322, 324 connected to the bottom the the containers are used to indicate water levels therein as described for FIG. 15. The lens assembly, support assembly and containers are easily assembled and disassembled. THe foci located in the water to be distilled in container 336 heat the water and cause it to evaporate, condensing on the bottom of planar plates 332. The condensate moves along plates 332 and falls into container 338. Depending upon location, production of distilled water will be about 1 pound per hour for a system as shown in FIG. 15 having a lens surface area of 10 square feet (about 1 square meter). This production of distilled water is without recovering the latent heat of condensation. Production of distilled water could be about eight times larger if the latent heat of condensation is recovered. As mentioned hereinbefore, portable systems can be used at sea or in desert areas.

Figure 17:
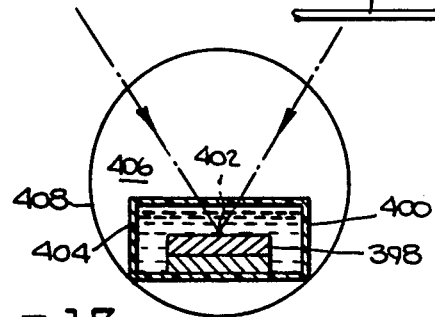
FIG. 17 is a cross-section view of a photovoltaic cell positioned in a fluid-carrying conduit to produce electricity from solar energy with fluid circulating inside and/or outside the conduit to remove heat.

According to another aspect of the invention, the concentrated solar energy is used to generate electricity by means of photovoltaic cells. Referring to FIG. 17, photovoltaic cells 398 made of silicon or cadmium sulfide or other materials are disposed in the interior of inner fluid-carrying conduit 400 shown advantageously to be of rectangular cross-section. The theoretical focus 402 of the lens is at the cells and preferably on the outer surface thereof. The cells may be juxtaposed in series and also in parallel in the theoretical focus 402 in linear or spaced if the theoretical focus 402 is a point focus. The concentrated luminous rays are converted to electricity by the cells while the heat absorbed by the cells from the infrared rays is removed by the circulating fluid 404 and also by the fluid 406 circulating within the outer conduit 408. The removal of heat can be controlled by the size of the conduits 402, 406 and by the volume and rate at which the fluid is circulated. Preferably fluid 404 is substantially electrically non-conductive such as air or other gases and liquids. Means (not shown) are provided for connecting the cells in parallel or series and for removing the generated electricity. If fluid 404 is electrically conducting, means (not shown) are provided for electrically insulating the cells and the means for interconnecting the cells and for removing the generated electricity. Conduit 402 has at least its upper surface made of transparent material if the theoretical focus 402 is linear or transparent apertures may be provided above the cells if the theoretical focus 402 is at a point. The upper part of outer conduit 408 is also transparent. The details of inner and outer conduits have been described hereinbefore.

As mentioned hereinbefore, concentrating the luminous energy of the sun with a concentration of up to about 100 permits electricity to be generated at up to about 100 times more power while the increased heat energy is dissipated and removed by the fluids in the conduits. As described hereinbefore, the amount of heat produced at the photovoltaic cells may be reduced by absorption of infrared radiation in a fluid lens. This will increase the efficiency of the cells while reducing the heat dissipating requirements of the collector. The heat absorbed in the lens fluid may be recovered as described hereinbefore. Electricity may be generated in conjunction with other uses of solar energy. For example, using a dual fluid carrying collector, photovoltaic cells may be inserted therein as just described and electricity generated while the heat energy is being used to heat a structure. Additionally, the electricity generated may be used to electrolyze water and/or salt to produce hydrogen, sodium and chlorine. The hydrogen may be used with carbon monoxide to manufacture methanol or with nitrogen of the air to produce amonia fertilizer and other nitrogen products such as nitric acid and urea. Such electrolysis may be used together with the distillation apparatus of the invention. Still further in accordance with the invention, apparatus generating electricity using solar energy may be combined with hydroelectric means having water storage means. Such a combination provides for the production of electricity at night, during periods of reduced sunshine, or during peak demand periods by the hydroelectric means while the solar energy system produces electricity during periods of sunshine. The solar energy system may be provided as a floating installation on the reservoir and thereby not require additional land.

Figure 18:
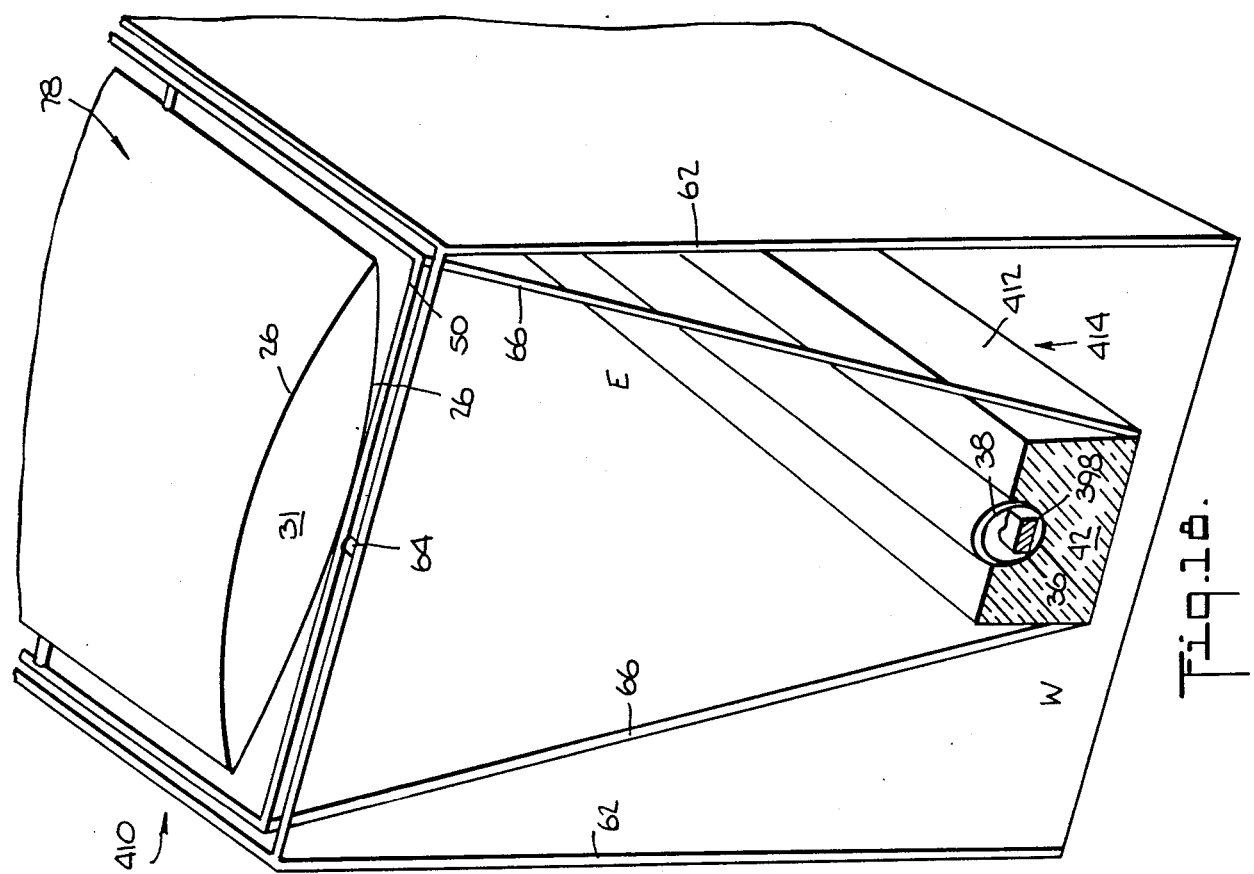
FIG. 18 is a schematic perspective diagram showing a system comprising an elongated, bi-convex fluid lens having a shortened focal length focused on a collector having photovoltaic cells therein in which the top of the collector is exposed to disperse heat produced thereat by the infrared rays, the fluid lens being movable and interconnected with the collector to track the seasonal and daily location of the sun as described in FIG. 1.

As mentioned hereinbefore, it may be advantageous in some instances to eliminate the plate 46 of FIG. 1 used to produce a greenhouse effect in the collector. Referring to FIG. 18, system 410 is shown comprising bi-convex fluid lens 78. Collector 414 does not include a plate such as plate 46 of FIG. 1 so that heat from the infrared rays is not retained in the collector. Additionally, photovoltaic cells 398 and transparent conduits 36, 38 are only partially located in container 412 of collector 414 to further disperse heat produced by infrared rays focused at the cells. Location of the conduits and cells only partially in insulating material 42 of container 412 provides a wide-angle exposure of the photovoltaic cells to the surface of the fluid-lens. Other details of collector 414 are similar to those described hereinbefore. Elimination of plate 46 and its associated sealant and the reduction in insulation used reduce the cost of the collector while dispersing heat produced by the infrared rays. The lens fluid and the distance between the lens plates 26 are chosen to maximize absorption of the infrared rays in the lens. The lens and collector are movable as described for FIG. 1. The bi-convex fluid lens 78 with the convex plates 26 shortens the lens focal distance to collector 414.

Fluid lenses having upper and lower plates are generally of large size and consequently have long focal lengths which are generally longer than the width of the plates. Longitudinal Fresnel lenses having longitudinal microprisms are generally of smaller size and have shorter focal lengths. Since the longitudinal microprisms decrease in height toward the center of the lens, the lens width is limited. Also, the width of the glass or plastic sheets used for the Fresnel lenses is limited. This can ben used to great advantage. For example, plate 46 or conduit 426 may be eliminated but the greenhouse effect retained by reducing the distance between the lenses and the collector in an enclosed system.

Figure 19:
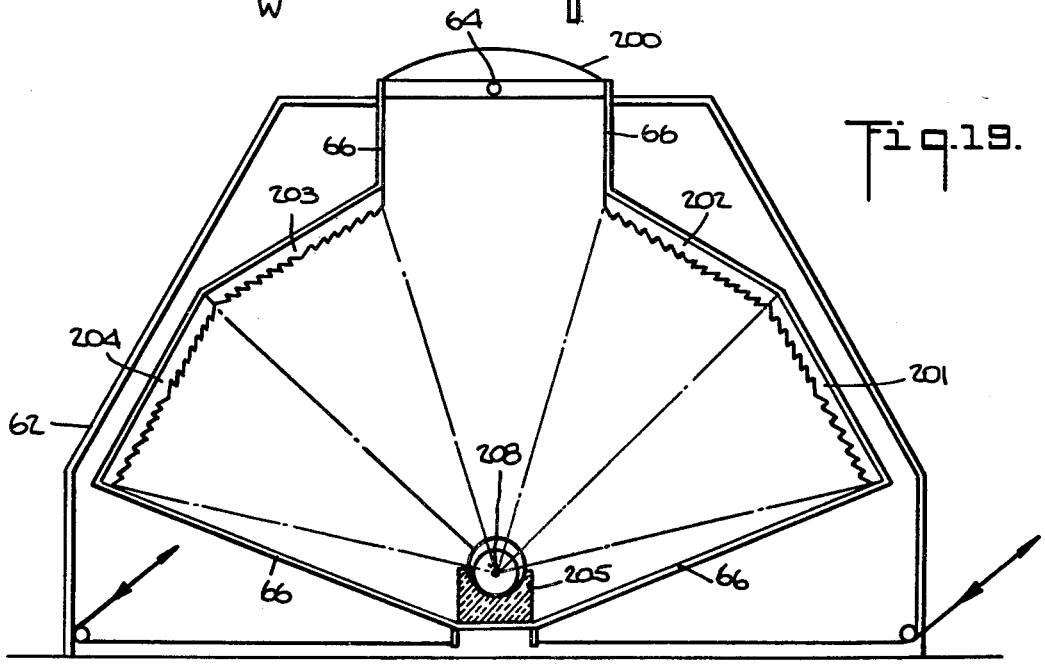
FIG. 19 is a schematic cross-section view of a lens system including a central fluid lens and adjacent Fresnel lenses each having engravings thereon angled to provide the Fresnel lenses with the same focus as that of the fluid lens, the common focus being located at an elongated collector which is interconnected with the lenses, both the lenses and collector being movable to track the sun's position.

FIG. 19 shows a combination of a central fluid lens 200 with four adjacent Fresenl-type lenses 201 and 204, each having engravings angled to direct the solar rays to a common elongated focus 208 which is also the focus of the central fluid lens. The lens system may be interconnected with collector 205 and be made movable to track the position of the sun as described hereinabove. The lens system may comprise two Fresnel-type lenses instead of four. Also, the lenses may be arranged longitudinally and transversely as shown in FIG. 9 to increase substantially the concentration of solar energy, particularly for use in the production of electricity with photovoltaic cells.

Fluid lenses are larger than Fresnel lenses and are less efficient absorbing and reflecting more solar energy than Fresnel lenses. Thus, a system comprised entirely of fluid lenses is generally less efficient than a system having only Fresnel lenses or at least one Fresnel lens combined with at least one fluid lens. Further in accordance with the invention, systems are provided which include fluid and Fresnel lenses. Such systems can be used to great advantage in distilling water where fluid lenses increase overall efficiency by recovering the heat of vaporization of the water being distilled. Referring to FIG. 20, such a system 450 is shown. System 450 comprises fluid lens 22 and Fresnel lenses 132A and 132B. Each lens has a different focus within channel 166 containing the water 170 to be distilled. Channel 166 is trough-shaped to provide varying depths of water and the different foci are located at different depths. A narrow Fresnel concentrator 132A is positioned over the area in channel 166 in which water to be distilled is introduced which is referenced by 451. Due to the single conduit in collector 188, and the location and size of lens 132A, collector 188 and lens 132A are used to preheat water introduced into channel 166, for example to 40° C. As a result, almost no condensation occurs at such location. Highly efficient Fresnel lens 132B is inclined at a steep angle with the horizontal facing north, and is focused inside the inner conduit in collector 172 which is of the two conduit type. Collector 172 and Fresnel lens 132B are connected and the lens is supported as described for FIG. 1 so both are movable to track the seasonal and hourly location of the sun. Preferably, flexible sheets 452, 453 are provided and attached on one side to the support for the Fresnel lens 132A and on the other side at the support structure for the fluid lens 22. The inner conduit 38 carries a high boiling point fluid which is capable of being heated to a high temperature of, for example, 200° C. This, in turn, heats the lower boiling point fluid in the outer conduit to, for example, 80° C. Because of its steep angle, because it is not cooled by a fluid as is a fluid lens, little vapor condenses on lens 132B. Fluid lens 22, having a lower efficiency than lens 132B, is inclined at a slight angle with the horizontal facing south of, for example, 15° which is sufficient to cause condensate to flow along lower plate 28 and be discharged into channel 168. Lens 22 is focused directly in channel 166 so that its focus will be in water 170 regardless of the sun's seasonal and daytime location. A substantial amount of the vapor will impinge on lens 22 because of its location. The Fresnel/fluid lens combination shown in FIG. 20 has the following advantages. Using a plurality of lenses, and collectors and foci at varying water depths permits heating the water to different temperatures at different depths to set up currents which assist in overall water heating and evaporation, thereby increasing system efficiency. Employing Fresnel lenses to heat the water while providing a fluid lens on which the vapor condenses permits recuperation of the heat of vaporization by the lens fluid while still employing the more efficient movable Fresnel lenses. The fluid lens is not movable since a suitable angle of inclination must be maintained for the condensate to flow along the bottom plate of the lens. The focus of lens 22 will always be in channel 166 regardless of season. Using a two conduit collector 172 at the focus of the efficient Fresnel lens and including a high boiling point fluid permits raising the temperature of that fluid to about 200° C. whereby heat may be stored as described hereinbefore and used during the night. Locating the focus of lens 22 directly in the channel heats up the water quickly and provides heat to the water 170 during periods of sunshine. During periods without sunshine (and even during periods of sunshine when heat is removed from the lens fluid), the lens fluid is cool and will provoke greater condensation of vapor. This combination permits continuous operation, the focus of lens 22 directly in the channel providing evaporation of water during periods of sunshine and collector 172 in which fluids are heated to 200° C. in the inner conduit and 80° C. in the outer conduit storing heat and providing for evaporation of water during periods with and without sunshine assisted by a lower lens plate 28 cooled by the lens fluid.

Another embodiment for distilling water similar to the apparatus shown in FIG. 20 is shown in FIG. 21. However, in FIG. 21, two sets of double plate fluid lenses are provided. One set of lenses 22A is inclined south at, for example, 15° with the horizontal and has a smaller distance between plates of, for example 1 inch at the point of maximum separation. Such plates will have sloped, cooled bottom plates to allow the vapor to condense on such plates and to flow toward and be discharged into channel 168. Another set of lenses 22B contains circulating lens fluid having preferably a boiling temperature over 200° C. and high infrared ray absorption characteristics. This fluid is circulated from the lens system into the inner conduits 38 of a series of perferably metallic interconnected collectors 172, 172A, 172B, 172C. A plurality of interconnected collectors is provided to increase the overall collector surface area in channel 166. The inner conduits 38 are inserted in outer conduits 36. Another fluid such as water flows in outer conduits 36 about conduit 38. The fluid circulated in conduit 36 will be heated to, for example, 90° C. to heat the water 170 contained in the vessel 166. The flow of the high temperature fluid in conduits 36 is stopped during hours without sunshine and the fluid with high temperature is stored in the inner conduits 38 and continues to heat the fluid in the outer conduits 36. The outer conduits 36 will in turn heat the water to be distilled during hours without sun. Lenses 22A with cooled bottom plates 28 will condense the water vapor so produced and also during hours without sunshine, and discharge the condensate into the channel 168. During hours with sunshine, lenses 22A provide heat for vaporization of the water to be distilled. In the system described above, and shown in FIG. 21, the lenses need not be made movable to track the sun since the foci of the lenses will always be in the vessel containing the water to be distilled. As mentioned hereinabove, preferably a salt/water solution and preferably sea water is used as the lens fluid, and in the case of distillation of seawater, the seawater from the lens being introduced into the vessel preheated.

Solar energy systems may, according to the invention, be combined with heat pumps (either with a compressor or an absorption system). The combination could be used in air conditioning systems, refrigeration systems and/or as a heat storage system wherein the heat pump provides heat when there is no or reduced sunshine. A heat pump uses either air or preferably water as a source of heat or heat obtained from solar energy collected by the fluid or fluids in the collectors described hereinabove to vaporize the circulating refrigerant. If water is used, a large reservoir is generally required as the outflowing water is cooled to a low temperature and may freeze if the reservoir is a small one. The heat obtainable from a heat pump depends on the difference in absolute temperature between the heat source used to vaporize the refrigerant and the condensed refrigerant. The heat obtained by the heat pump can be from two to five times higher than the power required in the compressor for the refrigerant. The heat pump may be used to provide additional heat during hours without sunshine. The combination of the solar energy system with a hydroelectric plant having a water reservoir can be used to great advantage with a heat pump, wherein the heat is obtained by the heat pump from the water of the reservoir of the hydroelectric plant.

Figure 22:
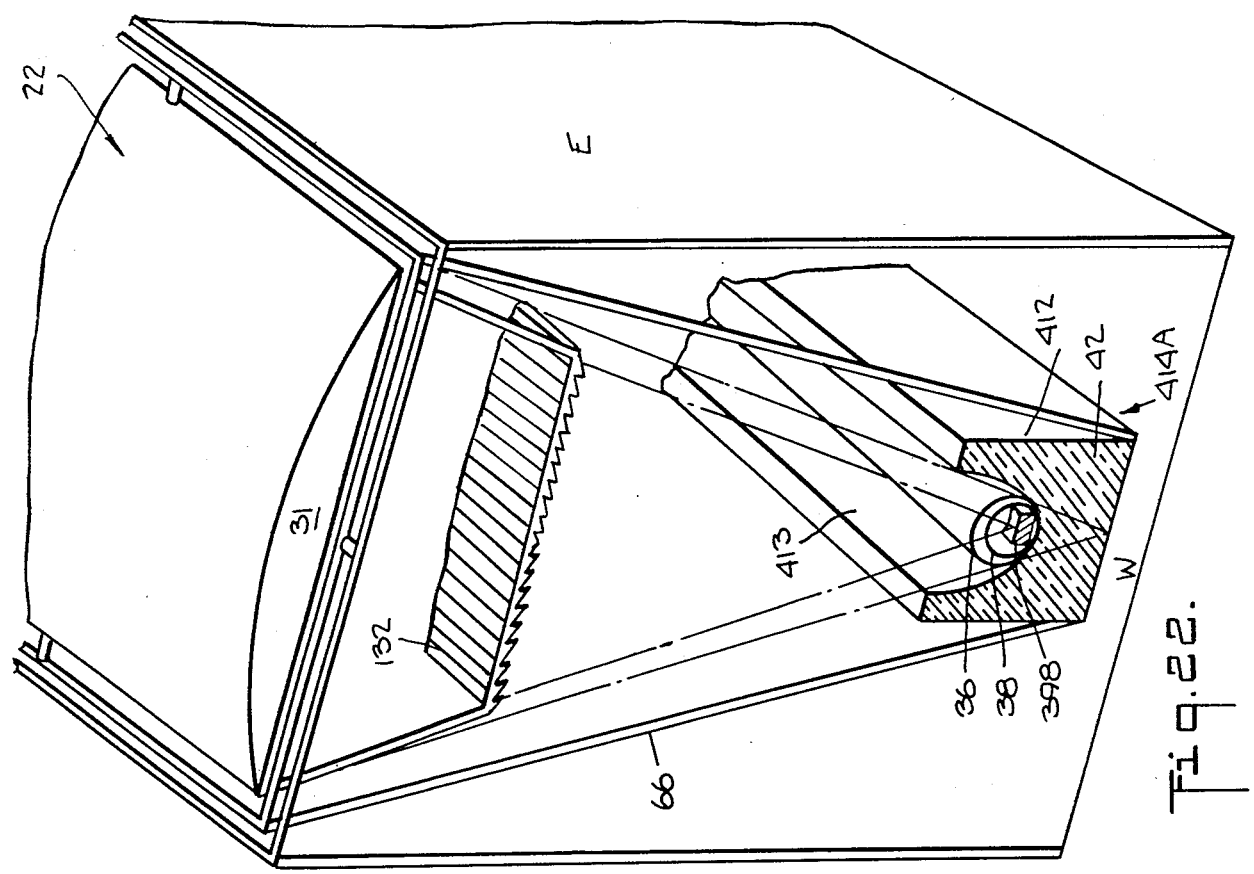
FIG. 22 is a schematic perspective diagram showing two lenses through which the solar rays pass serially to provide a sharper focus at a collector similar to the one of FIG. 18, the lenses and collector being movable to track the sun.

Lenses may also be combined so that the solar rays pass serially through them. Such an arrangement can shorten the focus of the lens arrangement and may provide a sharper focus at the collector and is particularly useful where the lens is focused on photovoltaic cells. FIG. 22 shows fluid lens 22 as described hereinabove superposed over Fresnel lens 132 as described hereinabove. The Fresnel lens shortens the otherwise longer focus of the fluid lens. Collector 414A is similar to collector 414, photovoltaic cells 398 being disposed therein as in FIG. 18. However, conduits 36, 38 are not enclosed to provide the greenhouse heating effect. In FIG. 22, the conduits are disposed entirely in insulating container 412A. However, the wide trough-like opening 413 in the container which is not closed off reduces greenhouse effect heating. Other collectors as described hereinbefore may be used where a greenhouse effect is desired. Both lenses are preferably movable to track the normal location of the sun. Lens 22 is supported as described for FIG. 1 while lens 132 is supported below lens 22 in a manner similar to that in which collector 414A is supported. Additionally, either lens may be superposed over the other and two Fresnel or two fluid lenses may be used.

Figure 23:
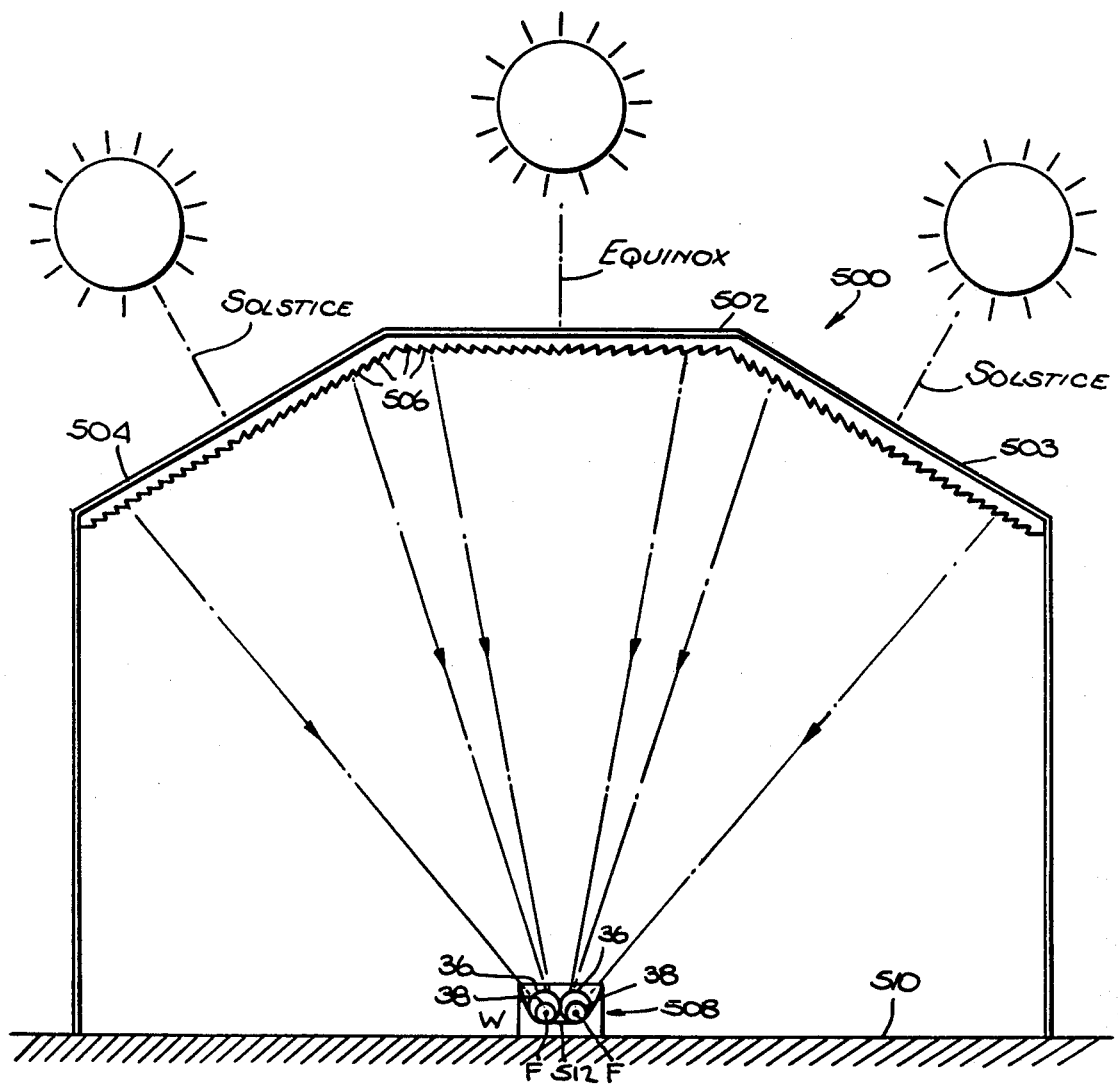
FIG. 23 is a schematic cross-section view showing a lens system including a central lens and adjacent Fresnel-type lenses each having engravings thereon angled to provide the adjacent Fresnel-type lenses with the same focus as that of the central lens, the lenses being positioned to place the lens system focus in or on a collector having two adjacent elongated conduits each enclosing another conduit during different times of the year without using sun tracking means.
Figure 24:
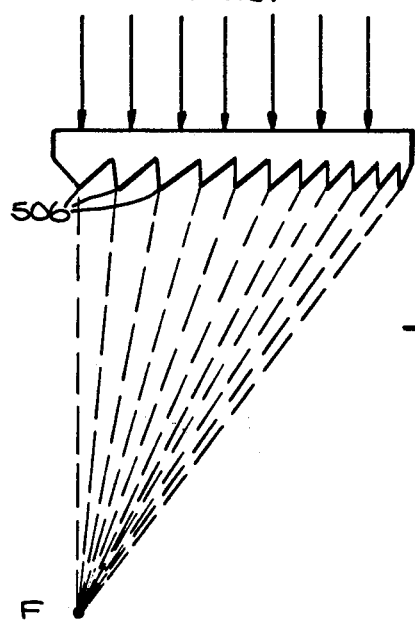
FIG. 24 is an enlarged schematic cross-section view showing one of the Fresnel-type lenses of FIG. 23.

In FIGS. 23–26 are shown a combination of a central Fresnel-type lens or lenses and adjacent Fresnel-type lenses which concentrate the solar energy along a substantially common focal line substantially regardless of season and time of day (FIGS. 25 and 26) without using sun tracking equipment. Referring to FIG. 23, lens system 500 is shown comprising central elongated Fresnel-type lenses 502 and adjacent elongated Fresnel-type lenses 503, 504. The central lens may also be a fluid lens. The lenses extend generally along the east west direction. The microprisms, referenced generally by 506, are angled and the lenses positioned to bring the lens system focus in or on collector 508 regardless of season. By way of illustration only, FIG. 15 schematically shows how the microprisms 506 may be angled to accomplish this. The central lens 502 is shown parallel to the earth's surface 510, but the entire system may be rotated so that lens 502 is at an angle with the earth's surface, depending upon location of the system. For the system shown in FIG. 23, lens 503 will primarily concentrate the solar energy during the time closely before and closely after the winter solstice, lens 502 during the time closely before the closely after the spring equinox, lens 504 during the time closely before and closely after the summer solstice, lens 502 during the time closely before and closely after the fall equinox, etc.

The focus F is located in or on collector 508 which comprises two adjacent transparent conduits 36 each enclosing an inner conduit 38. In this way, even with lateral deviation of the focal line, it will still be located in one of the conduits. Additionally, where the focal line may not be sharp, providing adjacent conduits permits the focal line to be partially located in a plurality of conduits. A curved reflecting plate 512 is preferably positioned below the conduits to direct any energy falling on it towards the conduits.

Referring now to FIG. 25, it is preferred that the Fresnel-type lenses located at the east and wast ends of the system be angled with respect to the inner lens to better orient those lenses for morning and evening concentration. For example, lens 520 at the east end is inclined to face the sun in the moring and lens 522 at the wast end is inclined to face the sun in the evening. The inner lens 524 is oriented to face the sun during the middle of the day. This lens arrangement provides for increased solar energy collection with using sun tracking equipment.

In FIG. 26 is shown a composite lens system including adjacent lenses such as lenses 503 and 504 positioned to primarily concentrate the solar energy during given seasons and lenses such as lenses 522, and 520 (not shown) positioned to primarily concentrate the solar energy during the morning and evening hours. Thus, with those lenses and lenses such as 502 and 524, the solar energy is concentrated throughout the day and year without using tracking equipment. As shown in FIG. 26, lenses such as 522 and 520 (not shown) may also be located intermediate the east and west ends.

In FIG. 27 is shown system 600 comprising a central fluid lens 22 (or set of fluid lenses), collector 414 and cylindrical reflectors 602-604 (or sets of reflectors). The reflectors may be made of metals, such as aluminum, having a highly polished surface, or the surfaces may be made of a highly polished metal which coats an epoxy-fiberglass base. The reflectors may also be made of other materials and may also be glass or plastic mirrors. The fluid lens and the reflectors are positioned such that reflectors 602 and 603 reflect and concentrate solar energy to reflector 604. Reflector 604 in turn reflects and concentrates the solar energy reflected to it towards collector 414. The solar energy reflected from reflector 604 passes through fluid lens 22 and is further concentrated into an elongated, substantially linear focus which lies in inner conduit 36 of collector 414. A substantial amount of heat may be produced in the lens fluid 31 by absorbtion therein of infrared energy reflected from reflectors 602-604. The lens fluid may be circulated as described hereinabove to recover and use the heat in the lens fluid. As also described hereinbefore, photovoltaic cells are placed in the collector and the lens fluid absorbs infra-red energy thereby reducing the heat produced at the photovoltaic cells. As shown in FIG. 27, the central lens 22, the reflectors 602-604 and the collector 24 are not movable. However, solar energy collection is increased over known systems since the reflectors reflect solar energy through the lens to the collector throughout the year, one or more reflectors primarily reflecting and concentrating the solar energy to and through the lens to the collector for each season. For example, with the system longitudinally arranged generally in the east-west direction, reflector 603 primarily reflects solar energy to reflector 604 after the autumn equinox and up to, during and shortly after the winter solstice, and before the spring equinox, and reflector 602 to reflector 604 after the spring equinox and up to, during and shortly after the summer solstice and before the autumn equinox. Shortly before, during and shortly after the spring and autumn equinoxes, both reflectors reflect the solar energy to reflector 604 somewhat substantially equally.

While a central fluid lens 22 has been shown between reflector 604 and collector 414 to concentrate the solar energy reflected from reflector 604 in an elongated focus located in collector 414, one or more fluid lenses may be located between either or both of reflectors 602 and 603 and the central reflector 604 to concentrate the energy reflected from the reflectors 602 and/or 603 onto central reflector 604.

To further increase solar energy collection, the central lens 22, the reflectors 602-604 and the collector are connected by members 605 as a unit to rotate about an axis running generally in the east-west direction to seasonally track the sun. The system is connected in a manner similar to those shown in FIGS. 1, 9 and 11. The reflectors and lens may also be individually made rotatable about a transverse axis generally running north-south to track the daily movement of the sun in a manner similar to those shown for FIGS. 1, 9 and 11. It is also contemplated that a Fresnel-type lens may be used instead of the fluid lens where it is not desired to absorb infrared energy in lens fluid 31 or to prevent transmission of infra-red energy towards the collector. It is understood that the individual reflectors and lens or lenses of FIG. 27 will be positioned in accordance with the location of the system and time of year.

Referring now to FIG. 28, composite system 620 for distilling water and producing electrical and/or mechanical power from solar energy is shown. System 620 is longitudinally arranged in the west-east direction. Units 622 of system 620 each comprise spaced first 624 and second 626 series of longitudinally arranged fluid lenses 26. Each series comprises sets 624a, 624b and 626a and 626b of fluid lenses. The first series 624 of fluid lenses is tilted north while the second series 626 is tilted south. The two series of fluid lenses are separated by first 628 and second 630 series of longitudinally arranged Fresnel (Fresnel-type) lenses 132. Series 628 is tilted south while series 630 is tilted north, series 628 being tilted south at an angle of 10° more than the angle of latitude of the location of the system. The fluid lenses and Fresnel lenses are mounted in frames 632 and 634, respectively, supported by support members 636. Central elongated container 638 is located below a substantial part of each series of fluid lenses, the central container being positioned so that the elongated foci F of each set of lenses is located in the central container during the day and throughout the year similar to the location of foci in channel 166 of system 160 shown in FIG. 13. As described for FIGS. 13 and 20, the multiple lens (Fresnel and fluid) and multiple foci system is capable of distilling water substantially continuously. Elongated containers 640 are positioned adjacent central container 638, the adjacent walls of the containers being in common or otherwise joined to permit the water being distilled to overflow from the central container to the adjacent containers. A channel 642 is located below the lower end of each series of fluid lenses to receive the condensate which flows downwardly along the bottom plates of the fluid lenses and is discharged therefrom. Common channels are provided for adjacent units which share the channel located between them. Corresponding containers of the different units are interconnected to maintain a common water level in the corresponding containers, i.e., containers 638 are interconnected through conduits 644, containers 640 are interconnected through conduits 646, and channels 642 are interconnected through conduits 648. Containers 640 and channels 642 of the same unit are also interconnected by conduits 646 and 648, respectively. Additionally, the fluid lenses of each series are serially interconnected as are the series of lenses themselves through conduits 650, and each series is also communicated with the container 638 located below the respective series by conduits 652. Valving is provided so that communication of the containers, channels and lenses may be selective. Insulation 653 is provided below the composite system and about the perimeter of the composite system, no insulation being necessary between adjacent units, thus reducing costs. The container bottoms are blackened to absorb solar energy and the height of water in the central container is maintained at a depth which is shallow enough to enhance evaporation and deep enough to permit the foci of the lenses to be distributed at different depths and locations in the container. Means may be provided such as sensors, motors and valves to automatically maintain liquid levels between predetermined depths.

Operation of composite system 620 described thus far is as follows: Water to be distilled in central container 638 is heated by the concentration of solar energy along the different foci of the fluid and Fresnel lenses. The water is evaporated and condensed generally as described hereinbefore. Briefly, the water is evaporated from the central container and the vapor rises and condenses on the bottom plates of the fluid lenses. The condensate flows along the fluid lens bottom plates and is discharged into channels 642. Distilled water and concentrated, undistilled water are removed from the system from time to time. Preferably, the containers are disposed at an angle to facilitate drainage therefrom. The water to be distilled is introduced into the system at a temperature which may, for purposes of illustration, be about 20° C. This water is preheated by introducing it into and circulating it through the fluid lenses, pump 655 circulating the water through the lenses. The preheated water, which may now be at a temperature of about 70° C., is discharged from the fluid lenses into the central container. That it is further heated to a temperature which may be about 85° C. and rapidly evaporated to form vapor which is condensed on the bottom plates of the fluid lenses. Most of the heat of condensation is transferred to the water in the fluid lenses. This recuperated heat of condensation and also heat produced in the water by the infrared energy absorbed therein and by the lens plates progressively raise the temperature of the water as it is circulated through the lenses and discharged therefrom at the aforementioned temperature of 70° C. The quantity of water circulated through the fluid lenses in raising the water temperature exceeds the quantity of water evaporated from the central container due to the concentration of solar energy by the lenses therein and may be as high or even higher than about 10 times the quantity of water evaporated per unit of time. The overall quantity of water evaporated may be up to the quantity of water circulated through the fluid lenses due to heating of the water in the lenses and to heating of the water with heat recuperated elsewhere in the system. Adjacent containers 640 are provided to receive any water circulated but not evaporated as it overflows the central container. The temperature of the overflowing water may be about 80° C. Additional containers (not shown) may also be provided. Containers 638 and 640 respectively, are sized to accommodate the water being discharged from the fluid lenses and the excess water and the brine are discharged from the containers from time to time. Heat transfer conduits 654 carrying a heat transfer fluid therein are located in the adjacent containers to remove heat from the over-flowing water. The water is circulated in opposite directions in adjacent sets of fluid lenses of a series so that one set will be cooler than the adjacent set to enhance condensation of vapor on the bottom plates of the cooler set of fluid lenses. The directions of flow of water in the fluid lenses are referenced by the arrows.

In addition to providing distilled water, composite system 620 may also provide electrical and/or mechanical energy. To accomplish this, conduits 654 provided in containers 640 to remove heat from the water therein are connected by conduits 656, 657 to turbine 658. The heat transfer fluid circulated in the conduits 654 is a low boiling temperature fluid which, for purposes of illustration, is Freon 12. The Freon 12 is heated to about 70° C. and 300 psig, and is introduced into and expanded in the turbine. Thereafter, the Freon is recirculated in conduits 654 through conduits 657. The Freon may also be circulated through conduits in channels 642 to increase the temperature and pressure of the Freon and the power obtainable therefrom. The Freon may also be preheated by the water being discharged from the fluid lenses.

Additional electrical and/or mechanical energy may be obtained by combining system 620 with one or more solar energy concentrators and collectors such as system 130 described hereinbefore. The inner conduit 38 of collector 24 (FIG. 1) contains a high boiling temperature fluid 56 (glycerine) and is connected to one or more heat exchangers 660, 662 by conduits 664, 665. Outer conduit 36 of collector 24 is connected to the interior of central container 638 by conduits 666 and water to be distilled is circulated therethrough. In this way, water to be distilled may be heated in collector 24. Fluid 56 is heated in collector 24 to a temperature which may be about 250° C. Excess water vapor which may be at a temperature of about 80° C. may be removed from system 620 through conduit 667 and condensed in condenser 669 using the water to be distilled to cool and condense the vapor. The condensed water is then discharged into container 642 thereby adding to the water to be distilled. Excess water vapor may also be removed through conduit 668 and compressed in compressor 670, the power from the compressor being supplied by the electricity produced from the overall-combined systems shown in FIG. 29. The compressed vapor is fed to heat exchanger 660 through conduit 672 and the vapor converted therein to superheated steam at a temperature which may be 200° C. The superheated steam is then supplied to turbine 674 through conduit 676 and mechanical or electrical power obtained therefrom. The exhaust from turbine 674 is fed to a heat exchanger 678 through conduit 680 and cooled and condensed therein to a temperature which may be about 30° C. by water to be distilled at a temperature of about 20° C. Most of the heat of condensation of the water condensing in heat exchanger 678 is recovered and transmitted to the water to be distilled. The condensed water is removed from heat exchanger 678 through conduit 682 which is interconnected with conduits 648. Additional distilled water is thereby produced. Fluid 56 is removed from heat exchanger 660 at a temperature which may be about 230° C. and supplied to heat exchanger 662 through conduit 665. When heat exchanger 662 is being utilized, Freon is supplied to the heat exchanger through conduit 686 before being supplied to turbine 658, valve 688 being opened accordingly. The heat exchangers 660, 662 may be of the type which comprise a coil in a chamber, fluid 56 being circulated in the coil and the compressed water vapor or Freon being circulated through the chamber. The 60° C. Freon is superheated in exchanger 662 to a temperature which may be about 150° C. by the 230° C. fluid 56 and the superheated Freon is fed to turbine 658 through conduit 690. The Freon is cooled if necessary, to a temperature which may be about 23° C. in exchanger 692 by water to be distilled at about 20° C. before being returned to conduits 654. Conduit 694 and valve 696 are provided for that purpose.

In the case of distillation of seawater, concentrated brine is removed from central containers 638 from time to time through conduits 698 and, if desired, fed to electrolysizing means 700 which are known in the art. Electricity from turbines 658 and 674 are fed to the electrolysizing means in addition to other electricity which may be provided from a photovoltaic-solar energy system. The concentrated brine is electrolysized to produce sodium and chlorine using as part of the electrical power requirements, electricity produced by system 620.

The entire system shown in FIG. 28 and described above is capable of providing substantially continuous distillation, storing heat as well as providing electrical and mechanical power.

CONCLUSION

Prominent aspects and advantages of the invention may be summarized as follows:

A lens concentration system is combined with a conduit collector system in which the surface area of the concentrating system exposed to the sun is larger than the surface area of the collecting system through which the energy is concentrated. As a result, heat losses are reduced substantially since the collector has an area of, for example, only from about 1% to 10% of conventional flat plate collector system. Thus, the efficiency over conventional flat plate systems is in the order of about 60% higher. This reduction in surface area reduces correspondingly the material requirements per unit of surface area exposed to the sun and the investment cost is also reduced correspondingly by about one-half. Additionally, higher efficiency results in a lower cost for energy produced.

In providing more efficient systems according to the invention, fluid lenses could be used to absorb infrared radiation thereby reducing the heat produced at the lens focus. This is extremely useful where photoelectric cells are located at the lens focus. In such fluid lenses, the distance between the lens plates is maximized and the lens fluid chosen for maximum absorption of infrared rays by the fluid lens. The heat absorbed by the lens fluid may be recovered and put to use. In other applications, the lens fluid and distance between the lens plates may be chosen to minimize absorption of the infrared rays by the fluid lens. In applications where a greenhouse effect is desirous to reduce heat losses, collectors according to the invention are provided with at least one conduit which is disposed in a collector container whose top is closed by a transparent plate and sealant therefor, or with a plurality of conduits with the outer conduit being transparent and containing a gaseous fluid enclosing at least one inner conduit and acting to provide a greenhouse effect for the inner conduit. The conduits in the collector container of the latter type may be exposed to the lens systems over a wide angle. The outer transparent conduit and the transparent plate providing the greenhouse effect may be eliminated where it is desired to disperse the heat from the infrared rays at the collector while still exposing the conduit at which the lens system is focused to a large lens surface area. Thus, efficiencies of the solar energy systems according to the invention can be increased while lowering cost by eliminating the transparent plate and sealant for the collector entirely or replacing it with a transparent conduit. Efficiency can further be increased and cost lowered by combining in a single system the use of Fresnel and fluid lenses, each of which provide individual advantages to the overall system. Such a composite system is particularly useful for distillating water and may include a plurality of collectors which are preferably located at different depths in the water to be distilled and include one collector which comprises a conduit carrying a high boiling point fluid capable of being heated to about 200° C. Thus, the collectors and lenses are used to provide efficient continuous operation. For example, the Fresnel lenses may be made movable to seasonally track the sun and are highly efficient while the fixed fluid lenses tilted at 15° can recover the latent heat of vaporization and can enhance condensation. The foci of the fixed fluid lenses remain in the channel holding the water to be distilled regardless of the seasonal position of the sun.

Further according to the invention water containing salt or other substances is distilled using solar energy collection and concentration according to the invention and recovering a large part of the latent heat of vaporization (about 540 calories per gram) released by the condensing vapor and the sensible heat. This is accomplished by using the fluid circulating in the lens system to recover the latent heat and circulating the fluid in the conduit in the water to be distilled or elsewhere thereby heating or preheating the water to be distilled or otherwise utilizing the recovered heat while cooling the lens fluid and lower plate to enhance condensation thereon. The recovered heat may also be used to heat fluids in the conduit. Additionally, the distilled water may be circulated through the conduits in the channel containing the water to be distilled or elsewhere to recover additional heat and this heat may also be used to heat or preheat the water to be distilled. Still further heat may be recovered from the heated brine discharged from time to time from the system by circulating it as described hereinabove for the lens fluid and condensate. Preferably a solution of salt in water or sea water is used as the lens fluid and can be introduced for distillation in preheated form.

In accordance with the invention, a system for substantially continuous distillation of water comprises series of fluid lenses in which the water to be distilled is preheated by circulating it through the fluid lenses. The water circulated in the lenses is heated by the heat recuperated from the heat of condensation of the vapor condensing on the bottom plates of the lenses and the heat obtained from infrared rays absorbed by the lens plates and the water in the lenses. As the water is circulated through the lenses, the heat from the heat of condensation and from the infrared rays cummulatively (progressively) heats the water, and the water temperature increases as the water is circulated through the lenses. To accommodate this heat, the water is circulated through the lenses and discharged for evaporation at a rate which is greater than the evaporation rate of the water due to concentration of the solar energy by the lenses. For example, the quantity of water circulated may be 10 times the quantity of that water evaporated per unit of time. The preheated water circulated through the lenses is discharged into a container in which the foci of the lens system is located and excess water overflows into adjacent containers. The heat in the water of the adjacent containers may be stored and/or used to heat a low boiling temperature fluid which is thereafter expanded in a turbine or engine. Thus, electricity and/or mechanical power may also be obtained from the distillation system. Additionally, the distillation system may be combined with another solar energy system for producing electricity using fluid and-/or Fresnel-type lenses and photovoltaic cells and/or with another solar energy system having fluid and/or Fresnel lenses and a collector to heat a low boiling temperature fluid which is supplied to a turbine or engine to produce electricity and/or mechanical power. The low boiling temperature fluid may be heated by a high boiling temperature fluid circulated through a collector. Excess water vapor may also be extracted from the distillation system and externally condensed to produce additional distilled water and/or superheated into steam by the high boiling temperature fluid and supplied to another turbine or engine to produce additional electricity and/or mechanical power. Electricity obtained from the turbines and/or from the photovoltaic cells many be used to electrolysize brine to obtain sodium and chlorine. Use of separate concentrating solar energy systems with the distillation system is particularly advantageous since those systems or parts of them may move to track the sun. In this way, the radiation surfaces for the collection of solar energy may be increased, doubled for example, over horizontal surfaces. Such movement is more easily accomplished in the separate systems then in the distillation system. Thus, in accordance with this aspect of the invention, seawater may be distilled, mechanical power obtained, electricity produced and/or sodium and chlorine obtained very efficiently and economically. The salt from the concentrated brine may also be recovered and sold or electrolyzed.

The invention provides for portable dismountable distillation units which could be used to distill seawater in life boats or brackish water in arid desert areas thereby possibly saving lives. The invention also contemplates a floating installation at sea on a large ship such as a previously mothballed aircraft carrier located in a warm, sunny climate whereby seawater can efficiently and inexpensively be distilled.

Further in accordance with the invention, frame means are disclosed for seasonally, hourly, and seasonally and hourly tracking the sun, and composite lens systems are disclosed in which individual lenses are positioned so the system concentrates the sun in or on a collector regardless of season and time of day without using tracking equipment.

Yet still further in accordance with the invention, solar energy collection can be increased by a system comprising a central reflector towards which adjacent reflectors reflect solar energy. A fluid or Fresnel-type lens (or lenses) is located in the stream of reflected solar energy between the adjacent reflectors and collector, the system concentrating the energy in an elongated focus in or on the collector. Fluid lenses are advantageously used when photovoltaic cells are disposed in the collector, the fluid lenses tending to absorb infrared energy while transmitting the luminous energy.

A bi-convex fluid lens may be used where it is desired to reduce the focal distance to a fluid lens. Fluid lenses and Fresnel-type lenses may also be serially disposed to shorten the focal distance of that lens system.

While specific applications of the invention have been described, many other uses of the collected solar energy are possible. For example, the salt by-product of desalination may be collected and sold to reduce the overall operating cost of the system. Additionally, the salt may be separate into sodium and chlorine by electrolysis by electricity preferably generated by the solar energy collecting system. In this aspect, water can be separated into hydrogen and oxygen also by electrolysis, from electricity preferably generated by solar energy, the hydrogen of which in turn may be used with carbon monoxide in the manufacture of liquid methanol which is easily transported and may be used as fuel for automobiles, airplanes, etc. The system described hereinbefore could be combined with hydroelectric means and/or with known heat pumps (compression and absorption) to further utilize the collected solar energy in combination with the heat provided by the heat pumps, particularly for refrigeration systems. In addition to providing energy for heating, the systems according to the invention could be used for air conditioning and, as just mentioned, in refrigeration systems. Also the multi-conduit collectors and fluids are capable of providing temperatures of about 70° C. to about 80° C. for heating rooms and for heating water, and at higher temperatures, for example, about 180° C. to about 200° C., for heat storage applications and to produce electricity, and may be combined with expansion motors.

The apparatus according to the invention has been described primarily using schematic diagrams. Accordingly, certain details not essential to an understanding of the invention have been omitted. For example, the materials and support structure comprising the apparatus according to the invention not described in detail will be known to those skilled in the respective arts. The sizes of the parts of the apparatus described hereinbefore will vary depending on the use to which the apparatus is put.

As shown in FIG. 9, many fluid lenses may be transversely and longitudinally juxtaposed to form composite systems from individual systems or to form very large systems. The Fresnel-type lenses may have similar length and width dimensions and may be similarly employed in composite or large systems. Portable distillation units may be used, for example, as mentioned hereinbefore, in lifeboats to distill seawater or in desert areas to distill brackish water and thereby possibly save lives. Portable units according to the invention could produce, for example, one pound of distilled water for every square meter (about 10 square feet) of lens concentrator area exposed to the sun's rays, and this without recapturing the heat of condensation. The production of distilled water, however, will be about eight times as great if the heat of condensation is recovered.

It is pointed out that the heat obtained from the sun using the energy systems according to the invention may be lower in cost than heat energy obtained from fuels which must be replaced. Heat storage provided by systems according to the invention is a feature which also makes these systems competitive with fuel. The distillation systems according to the invention are capable of providing distilled water at low cost and therefore are important where clean water is scarce.

The advantages of the present invention, as well as certain changes and modifications of the disclosed embodiments thereof, will be readily apparent to those skilled in the art. It is the applicant's intention to cover by his claims all those changes and modifications which could be made to the embodiments of the invention herein chosen for the purposes of the disclosure without departing from the spirit and scope of the invention. Protection by Letters Patent of this invention in all its aspects as the same are set forth in the appended claims is sought to the broadest extent that the prior art allows.

What is claimed is:

1. Apparatus for distillation of liquids using solar energy comprising:
   first container means for containing a liquid to be distilled;
   second container means for containing distilled liquid;
   fluid lens means located above said first container means for concentrating the solar energy in at least one focus in said first container means to assist in the evaporation of said liquid therefrom, said fluid lens means defining an enclosure through which liquid to be distilled is passed and a planar lower surface extending at an angle with the horizontal and having a lower end disposed above said second container means, said planar surface being operative to condense evaporated liquid vapor thereon and transfer at least in part to said liquid being passed through said enclosure the heat of condensation released by condensing liquid vapor, whereby a substantial portion of the released heat of condensation is recovered, said planar surface being further operative to discharge condensed liquid vapor from said lower end into said second container means; and means for passing the liquid to be distilled through said enclosure, said means for passing and said fluid lens means cooperating to discharge into said first container means said liquid to be distilled which has been passed through said enclosure at a rate which exceeds the rate at which said liquid is evaporated from said first container means such that the temperature of the liquid passed through said enclosure is maintained below the temperature of the evaporated liquid vapor.

2. The apparatus recited in claim 1, wherein said first container means includes a plurality of containers, a first container receiving the liquid being discharged from said fluid lens means and at least one other container operative to receive liquid from said first container, said focus of said fluid lens means being located in said first container.

3. The apparatus recited in claim 2 and further comprising first heat exchange means in said other container operative to remove heat from the liquid therein.

4. The apparatus recited in claim 2 and comprising a plurality of first container means, a plurality of second container means, a plurality of fluid lens means and a plurality of said means for circulating liquid all arranged to form a composite distillation system comprising a plurality of said apparatuses adjacently arranged and including means for interconnecting first containers of said apparatus, means for interconnecting other containers of said apparatus and means for interconnecting second container means, which comprise single common containers for each two of said apparatuses which are adjacent each other, each of said common containers being located between adjacent apparatuses and being operative to receive and contain condensed vapor from both of said two apparatuses.

5. The apparatus recited in claim 2, wherein said at least one other container is operative to store heat in the liquid therein for use during periods of reduced sunshine or without sunshine.

6. The apparatus recited in claim 3, wherein said first heat exchange means includes a heat exchange fluid to which the heat removed from the liquid is transferred, said apparatus further comprising turbine means and means for supplying said fluid to said turbine means from said first heat exchange means.

7. The apparatus recited in claim 6, and further comprising an additional solar energy system for converting solar energy to heat and second heat exchange means, said additional system including means providing heat to said second heat exchange means and means supplying said fluid to said second heat exchange means upstream of said turbine, said second heat exchange means being operative to transfer heat from said additional system to said fluid, and said apparatus also including means supplying said fluid from said second heat exchange means to said turbine.

8. The apparatus recited in claim 7, wherein the liquid is water, and further comprising third heat exchange means and means providing heat from said additional system to said third heat exchange means, said apparatus further comprising means for compressing water vapor, means for removing water vapor from said apparatus and supplying it to said means for compressing, and means for supplying compressed water vapor from said means for compressing to said third heat exchange means, said third heat exchange means being operative to transfer heat from said additional system to the compressed water vapor to produce steam.

9. The apparatus recited in claim 8, wherein said additional system includes elongated lens means and an elongated collector located at an elongated focus of said elongated lens means, said collector including at least two conduits, an inner conduit being located in another conduit, said apparatus further comprising means communicating said inner conduit serially with said third heat exchange means and thereafter with said second heat exchange means, said inner conduit being located at the elongated focus and carrying a high boiling temperature fluid having a boiling temperature greater than about 150° C.

10. The apparatus recited in claim 8 and further comprising an additional turbine and means supplying said steam to said additional turbine.

11. The apparatus recited in claim 10, wherein the liquid is salt water and said apparatus further comprises means for electrolysizing salt water to produce sodium and chlorine from salt-rich salt water remaining after evaporation of at least some water from said first container means, both of said turbines producing electricity and providing at least part of the electrical energy required to electrolyze the salt water.

12. The apparatus recited in claim 10 and further comprising means for condensing steam discharged from said additional turbine using water to be distilled to produce additional distilled water, said means recuperating most of the heat of condensation of the condensing steam and transferring it to the water to be distilled.

13. The apparatus recited in claim 9 and further comprising means communicating said another conduit with said first container means.

14. The apparatus recited in claim 9, wherein the elongated lens means of the additional system includes at least one fluid lens.

15. The apparatus recited in claim 9, wherein the elongated lens means of the additional system includes at least one Fresnel lens.

16. The apparatus recited in claim 1 wherein the liquid is saltwater and further comprising means for recovering heat from the concentrated brine removed from the container means from time to time.

17. The apparatus recited in claim 1 and further comprising means for recovering heat from the condensed liquid.

18. The apparatus recited in claims 1 wherein the liquid is water and further comprising means for removing water vapor from said apparatus and means for externally condensing the removed water vapor to produce distilled water.

* * * * *

UNITED STATES PATENT AND TRADEMARK OFFICE
CERTIFICATE OF CORRECTION

PATENT NO. : 4,194,949
DATED : March 25, 1980
INVENTOR(S) : Virgil Stark

It is certified that error appears in the above—identified patent and that said Letters Patent is hereby corrected as shown below:

In the Abstract, line 23, change "and or" to --and/or--.

Column 1, line 32, change "fluidcarrying" to --fluid-carrying--.

Column 4, line 28, change "producting" to --producing--.

Column 8, line 47, change "loses" to --losses--.

Column 9, line 17, change "loses" to --losses--.

Column 9, line 22, change "seperated" to --separate--.

Column 9, line 53, change "photovolatic" to --photovoltaic--.

Column 9, line 58, before "heat" delete --the--.

Column 10, lines 1-2, change "electrolysized" to --electrolyzed--.

UNITED STATES PATENT AND TRADEMARK OFFICE
CERTIFICATE OF CORRECTION

PATENT NO. : 4,194,949
DATED : March 25, 1980
INVENTOR(S) : Virgil Stark

It is certified that error appears in the above—identified patent and that said Letters Patent is hereby corrected as shown below:

Column 14, line 23, change "would" to --wound--.

Column 16, line 41, change "darked" to --darkened--.

Column 17, line 41, change "cirvilinear" to --curvilinear--.

Column 17, line 52, after "and/or" delete --or--.

Column 20, line 64, change "vapors" to --vapor--.

Column 21, line 14, change "approxmately" to --approximately--.

Column 23, line 50, delete "the", last occurrence.

Column 23, line 54, change "THe" to --The--.

Column 24, line 51, change "amonia" to --ammonia--.

Column 25, line 30, change "ben" to --be--.

Column 28, line 38, change "the" to --and-- (first occurrence).

UNITED STATES PATENT AND TRADEMARK OFFICE
CERTIFICATE OF CORRECTION

PATENT NO. : 4,194,949
DATED : March 25, 1980
INVENTOR(S) : Virgil Stark

It is certified that error appears in the above—identified patent and that said Letters Patent is hereby corrected as shown below:

Column 28, line 53, change "wast" to --west--.

Column 28, line 57, change "moring" to --morning--.

Column 28, line 58, change "wast" to --west--.

Column 29, line 23, change "absorbtion" to --absorption--.

Column 31, line 19, change "That" to --There--.

Column 32, lines 63 and 65, change "electrolysizing" to --electrolyzing--.

Column 32, line 67, change "electrolysized" to --electrolyzed--.

Column 33, line 18, change "system" to --systems--.

Column 34, line 41, change "cummulatively" to --cumulatively--.

UNITED STATES PATENT AND TRADEMARK OFFICE
CERTIFICATE OF CORRECTION

PATENT NO. : 4,194,949

DATED : March 25, 1980

INVENTOR(S) : Virgil Stark

It is certified that error appears in the above—identified patent and that said Letters Patent is hereby corrected as shown below:

Column 35, line 7, change "many" to --may--.

Column 35, line 7, change "electrolysize" to --electrolyze--.

Column 35, line 57, change "separate" to --separated--.

Column 35, line 59, change "aspect" to --respect--.

Column 38, line 33, change "electrolysizing" to --electrolyzing--.

Column 38, line 62, change "claims" to --claim--.

Signed and Sealed this

Sixth Day of January 1981

[SEAL]

Attest:

Attesting Officer

SIDNEY A. DIAMOND

Commissioner of Patents and Trademarks